United States Patent
Sinha et al.

(10) Patent No.: US 11,598,725 B2
(45) Date of Patent: Mar. 7, 2023

(54) HIGH-THROUGHPUT HYPERSPECTRAL IMAGING SYSTEMS

(71) Applicant: Verily Life Sciences LLC, South San Francisco, CA (US)

(72) Inventors: Supriyo Sinha, Menlo Park, CA (US); Charles Santori, Palo Alto, CA (US); Andrew Conrad, Malibu, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 0 days.

(21) Appl. No.: 17/734,222

(22) Filed: May 2, 2022

(65) Prior Publication Data

US 2022/0260494 A1 Aug. 18, 2022

Related U.S. Application Data

(63) Continuation of application No. 17/062,191, filed on Oct. 2, 2020, now Pat. No. 11,327,017, which is a
(Continued)

(51) Int. Cl.
*G01N 21/64* (2006.01)
*G02B 21/00* (2006.01)
(Continued)

(52) U.S. Cl.
CPC .......... *G01N 21/6456* (2013.01); *G01J 3/021* (2013.01); *G01J 3/0208* (2013.01);
(Continued)

(58) Field of Classification Search
CPC .... G01J 3/0208; G01J 3/21; G01J 3/10; G01J 3/142823; G01J 3/4406; G01J 2003/2826;
(Continued)

(56) References Cited

U.S. PATENT DOCUMENTS 6,039,925 A   3/2000  Nemoto
9,835,491 B1  12/2017 Mooney
(Continued)

FOREIGN PATENT DOCUMENTS

CN   104568872   4/2015
CN   106226247   12/2016
(Continued)

OTHER PUBLICATIONS

U.S. Appl. No. 15/680,050 , "U.S. Non-Provisional Patent Application No.", Lens Let Based Snapshot Hyperspectral Camera, filed Aug. 17, 2017, 36 pages.
(Continued)

*Primary Examiner* — Mark R Gaworecki
(74) *Attorney, Agent, or Firm* — Kilpatrick Townsend & Stockton LLP

(57) ABSTRACT

High-throughput hyperspectral imaging systems are provided. According to an aspect of the invention, a system includes an excitation light source; an objective that is configured to image excitation light onto the sample, such that the excitation light causes the sample to emit fluorescence light; a channel separator that is configured to separate the fluorescence light into a plurality of spatially dispersed spectral channels; and a sensor. The excitation light source includes a light source and a plurality of lenslet arrays. Each of the lenslet arrays is configured to receive light from the light source and to generate a pattern of light, and the patterns of light generated by the lenslet arrays are combined to form the excitation light. The objective is configured to simultaneously image each of the patterns of light to form a plurality of parallel lines or an array of circular spots at different depths of the sample.

20 Claims, 28 Drawing Sheets

Related U.S. Application Data continuation of application No. 16/247,049, filed on Jan. 14, 2019, now Pat. No. 10,816,473.

(60) Provisional application No. 62/620,137, filed on Jan. 22, 2018.

(51) Int. Cl.

| | |
|---|---|
| *G02B 21/16* | (2006.01) |
| *G02B 21/36* | (2006.01) |
| *G01J 3/02* | (2006.01) |
| *G01J 3/10* | (2006.01) |
| *G01J 3/14* | (2006.01) |
| *G01J 3/28* | (2006.01) |
| *G01J 3/44* | (2006.01) |

(52) U.S. Cl.
CPC . *G01J 3/10* (2013.01); *G01J 3/14* (2013.01); *G01J 3/2823* (2013.01); *G01J 3/4406* (2013.01); *G01N 21/64* (2013.01); *G02B 21/0076* (2013.01); *G02B 21/16* (2013.01); *G02B 21/361* (2013.01); *G01J 2003/2826* (2013.01); *G01N 21/6458* (2013.01); *G01N 21/6486* (2013.01); *G01N 2021/6419* (2013.01); *G01N 2021/6421* (2013.01); *G01N 2021/6423* (2013.01); *G01N 2021/6471* (2013.01); *G01N 2201/0635* (2013.01)

(58) Field of Classification Search
CPC ........... G01N 21/6456; G01N 21/6458; G01N 2021/6419; G01N 2021/6421; G01N 2021/6423; G01N 2021/6471; G01N 2201/0635; G02B 21/0076; G02B 21/16; G02B 21/361
See application file for complete search history.

(56) References Cited

U.S. PATENT DOCUMENTS

| | | |
|---|---|---|
| 10,816,473 B2 | 10/2020 | Sinha et al. |
| 2004/0125370 A1 | 7/2004 | Montagu |
| 2010/0053743 A1 | 3/2010 | Galimberti et al. |
| 2010/0309467 A1 | 12/2010 | Fox et al. |
| 2015/0153156 A1 | 6/2015 | Shah |
| 2015/0355449 A1 | 12/2015 | Orth et al. |
| 2017/0205857 A1 | 7/2017 | Moore et al. |
| 2017/0343477 A1 | 11/2017 | Santori et al. |
| 2017/0343784 A1 | 11/2017 | Wu et al. |
| 2017/0343824 A1 | 11/2017 | Sinha et al. |

FOREIGN PATENT DOCUMENTS

| | | |
|---|---|---|
| CN | 107101982 | 8/2017 |
| JP | 2002526788 | 8/2002 |
| JP | 2003050354 | 2/2003 |
| JP | 2005085885 | 3/2005 |
| JP | 2006296635 | 11/2006 |
| JP | 2010032513 | 2/2010 |
| WO | 2017145230 | 8/2017 |
| WO | 2017205857 | 11/2017 |

OTHER PUBLICATIONS

U.S. Appl. No. 16/247,049 , Non-Final Office Action, dated May 4, 2020, 13 pages.
U.S. Appl. No. 16/247,049 , Notice of Allowance, dated Jun. 23, 2020, 8 pages.
U.S. Appl. No. 17/062,191 , "Corrected Notice of Allowability", dated Apr. 4, 2022, 2 pages.
U.S. Appl. No. 17/062,191 , Notice of Allowance, dated Dec. 30, 2021, 11 pages.
Bodkin et al., "Snapshot Hyperspectral Imaging—The Hyperpixel Array™ Camera", Proceedings of SPIE—The International Society for Optical Engineering, vol. 7334, Apr. 13-17, 2009, 11 pages.
Application No. CN201980009680.4 , Notice of Decision to Grant, dated Jun. 25, 2021, 8 pages.
Application No. CN201980009680.4 , Office Action, dated Jan. 20, 2021, 10 pages.
Application No. EP19702798.0 , Office Action, dated Jul. 9, 2021, 7 pages.
Application No. JP2020-535186 , Notice of Decision to Grant, dated Feb. 2, 2021, 3 pages.
Application No. JP2021-029378 , Notice of Decision to Grant, dated Mar. 1, 2022, 3 pages.
Lavagnino et al., "Snapshot Hyperspectral Light-Sheet Imaging of Signal Transduction in Live Pancreatic Islets", Biophysical Journal, vol. 111, Jul. 26, 2016, pp. 409-417.
Lee et al., "3D Imaging Using Lens Array and Incoherent Light", 2015 IEEE 13th International Conference on Industrial Informatics, Jul. 22-24, 2015, pp. 668-672.
Application No. PCT/US2019/013487 , International Preliminary Report on Patentability, dated Aug. 6, 2020, 13 pages.
Application No. PCT/US2019/013487 , International Search Report and Written Opinion, dated Apr. 1, 2019, 18 pages.

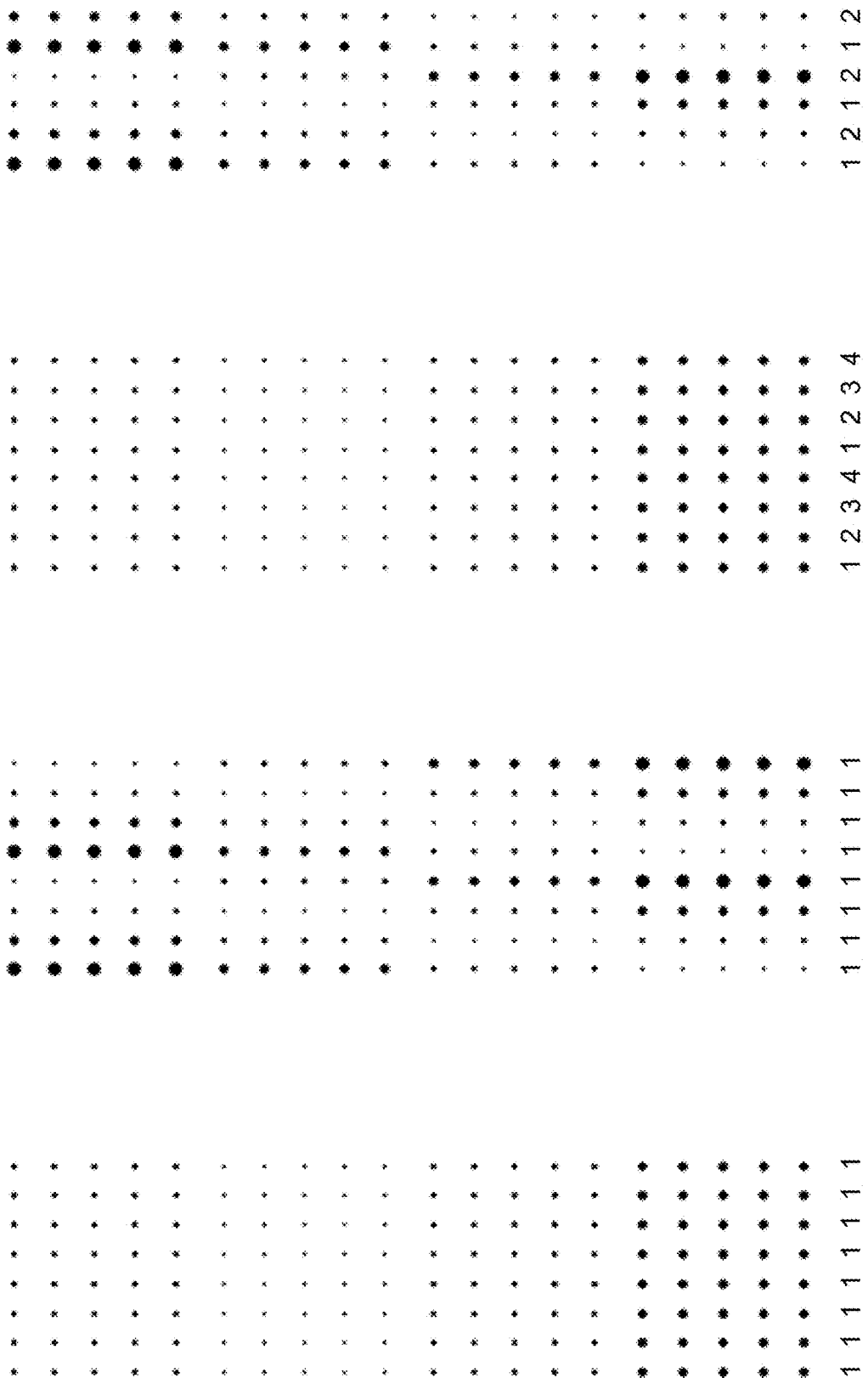

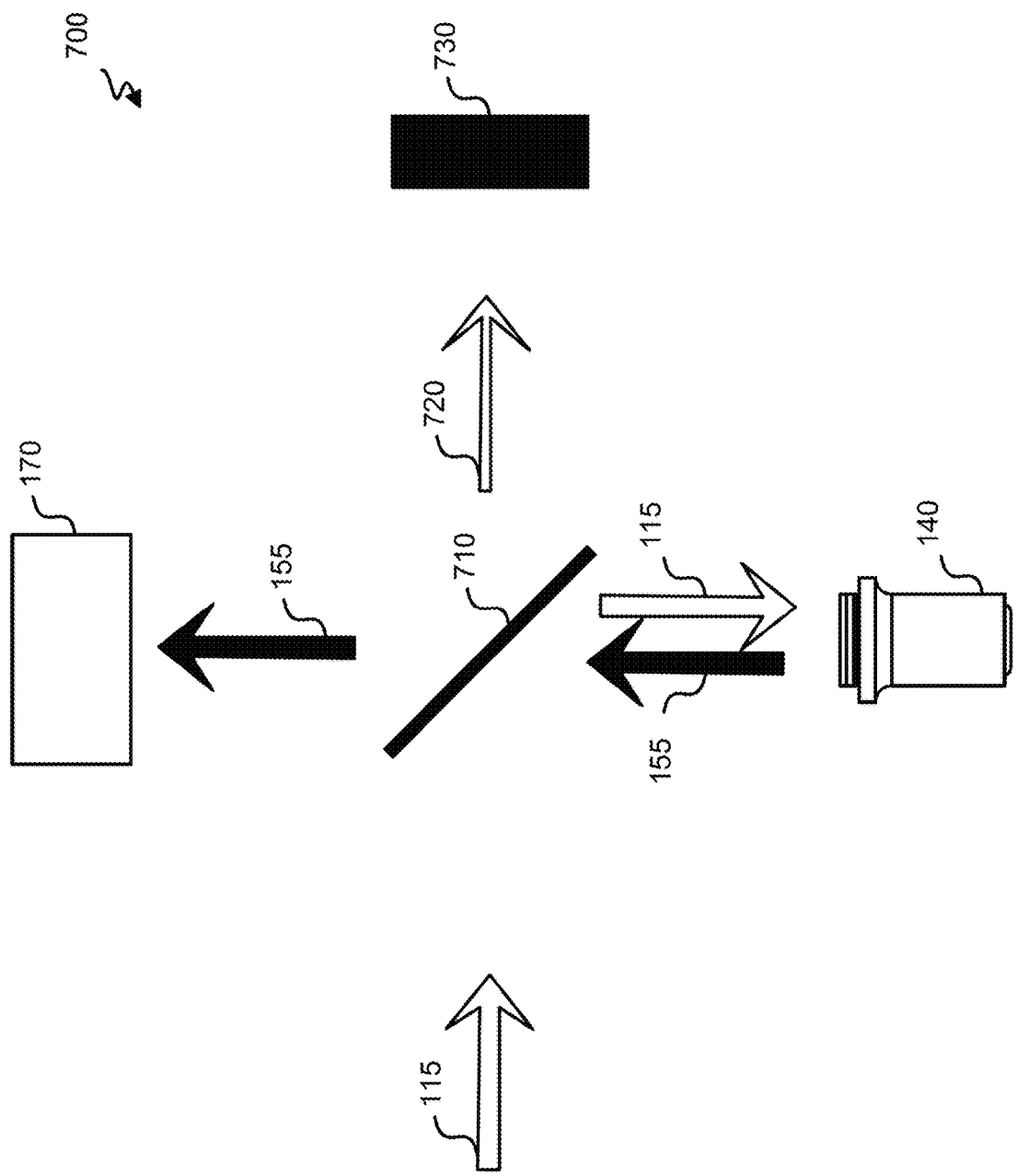

HIGH-THROUGHPUT HYPERSPECTRAL IMAGING SYSTEMS

CROSS-REFERENCE TO RELATED APPLICATIONS

This application is a continuation of U.S. patent application Ser. No. 17/062,191 filed on Oct. 2, 2020, which is a continuation of U.S. patent application Ser. No. 16/247,049 filed on Jan. 14, 2019, now U.S. Pat. No. 10,816,473, which claims priority under 35 U.S.C. § 119 to U.S. Provisional Patent Application No. 62/620,137, filed on Jan. 22, 2018, the contents of which are hereby incorporated by reference in their entireties for all purposes.

BACKGROUND OF THE INVENTION

Hyperspectral imaging systems collect light from a sample and spatially disperse the light into a spectrum of wavelengths or narrow spectral bands. For example, excitation light may be focused on a sample, and emission light produced by fluorescence from the sample may be collected. A hyperspectral image includes a set of spectral images, each of which is a two-dimensional spatial image that is acquired at a different wavelength or spectral band. The spectral images are combined to form a three-dimensional $(x,y,\lambda)$ hyperspectral data cube, where x and y represent two spatial dimensions, and $\lambda$ represents the spectral dimension.

Hyperspectral imaging may be used to analyze biological samples. Maximizing information throughput from biological samples may help distinguish between different cell types and tissue types. A high throughput may be helpful in a surgical environment to make quick decisions at an operating table, or to efficiently build up a database of information for machine learning applications. In addition, a high throughput may enable the capturing of rapid dynamics or motion, or studies of cell signaling dynamics or protein diffusion.

Some hyperspectral imaging systems use tunable filters, such as liquid crystal filters, in the emission path to capture the fluorescence at reasonably high spectral resolution (~5-10 nm). However, this approach suffers from the disadvantage of bleaching, because the filters use absorption to selectively capture a small slice of the fluorescence. Bleaching is problematic because fluorophores often have a limited number of photons that they can emit before going dark. Bleaching is especially problematic for tunable filters because it causes the emission intensity to change while the filter is scanned, distorting the spectrum and causing errors when spectral unmixing is used to estimate fluorophore concentrations from the hyperspectral data. Also, these systems use a wide-field approach that prevents confocality or depth sectioning from being performed, which makes their use with thick tissue samples problematic.

Other hyperspectral imaging systems use a digital micromirror device (DMD) or a cylindrical lenslet array to produce patterned illumination on the sample. A grating or prism structure spatially disperses the fluorescence across a two-dimensional imaging sensor to acquire a hyperspectral image. The patterned illumination is then scanned across the sample (or the sample is scanned with the patterned illumination remaining fixed) to obtain a hyperspectral data cube. These systems reduce bleaching, because all of the excitation photons are collected, and since the entire spectrum is collected at once, the spectral distortion is further reduced. Furthermore, these systems can provide depth sectioning, which allow them to be used with thicker tissue samples. However, these systems rely on scanning either one depth at a time or one excitation laser at a time, thereby limiting the data acquisition speed and throughput.

SUMMARY OF THE INVENTION

Exemplary embodiments of the invention provide high-throughput hyperspectral imaging systems. According to an aspect of the invention, a system includes an excitation light source that is configured to emit excitation light; an objective that is configured to receive the excitation light from the excitation light source and image the excitation light onto the sample, such that the excitation light causes the sample to emit fluorescence light; a channel separator that is configured to receive the fluorescence light from the sample and separate the fluorescence light into a plurality of spatially dispersed spectral channels; and a sensor that is configured to receive the plurality of spatially dispersed spectral channels from the channel separator. The excitation light source includes a light source and a plurality of first lenslet arrays. Each of the plurality of first lenslet arrays is configured to receive light from the light source and to generate a pattern of light, and the patterns of light generated by the plurality of first lenslet arrays are combined to form the excitation light. The objective is configured to simultaneously image each of the patterns of light to form a plurality of parallel lines or an array of circular spots at different depths of the sample.

In some embodiments, the channel separator may include a reflective layer having a plurality of first reflective elements, wherein each first reflective element of the plurality of first reflective elements is configured to reflect a first portion of the fluorescence light that is generated by a first pattern of light of the patterns of light; a patterned layer that is configured to transmit a second portion of the fluorescence light that is generated by a second pattern of light of the patterns of light; first dispersion optics that are configured to receive the first portion of the fluorescence light from the reflective layer and to spatially disperse spectral components of the first portion of the fluorescence light; and second dispersion optics that are configured to receive the second portion of the fluorescence light from the reflective layer and to spatially disperse spectral components of the second portion of the fluorescence light.

In other embodiments, the channel separator may include a second lenslet array that is configured to focus the fluorescence light, and dispersion optics that are configured to receive the fluorescence light from the second lenslet array and to spatially disperse spectral components of the fluorescence light. The second lenslet array may include a plurality of linear arrays of lenslets that are configured to receive the fluorescence light as a plurality of parallel lines.

In other embodiments, the channel separator may include dispersion optics that are configured to spatially disperse spectral components of the fluorescence light, and a second lenslet array that is configured to receive the fluorescence light from the dispersion optics and to focus the fluorescence light. The second lenslet array comprises a plurality of linear arrays of lenslets that are configured to receive the fluorescence light as a plurality of parallel lines.

The system may also include a dichroic beamsplitter that is configured to reflect the excitation light from the excitation light source toward the objective, and to transmit the fluorescence light from the sample toward the channel separator. A transmission spectrum of the dichroic beamsplitter may include a notch that coincides with a wavelength of the light from the light source.

According to another aspect of the invention, a system includes an excitation light source that is configured to emit excitation light; an objective that is configured to receive the excitation light from the excitation light source and image the excitation light onto the sample, such that the excitation light causes the sample to emit fluorescence light; a channel separator that is configured to receive the fluorescence light from the sample and separate the fluorescence light into a plurality of spatially dispersed spectral channels; and a sensor that is configured to receive the plurality of spatially dispersed spectral channels from the channel separator. The excitation light source includes a plurality of light sources, wherein each of the plurality of light sources emits light having a different wavelength, and a first lenslet array, wherein the first lenslet array is configured to receive light from each of the plurality of light sources and to generate a plurality of patterns of light corresponding to the plurality of light sources, and the patterns of light generated by the first lenslet array are combined to form the excitation light. The objective is configured to simultaneously image each of the patterns of light to form a plurality of parallel lines or an array of circular spots at a same depth of the sample.

In some embodiments, the channel separator may include a reflective layer having a plurality of first reflective elements, wherein each first reflective element of the plurality of first reflective elements is configured to reflect a first portion of the fluorescence light that is generated by a first pattern of light of the patterns of light; a patterned layer that is configured to transmit a second portion of the fluorescence light that is generated by a second pattern of light of the patterns of light; first dispersion optics that are configured to receive the first portion of the fluorescence light from the reflective layer and to spatially disperse spectral components of the first portion of the fluorescence light; and second dispersion optics that are configured to receive the second portion of the fluorescence light from the reflective layer and to spatially disperse spectral components of the second portion of the fluorescence light.

In other embodiments, the channel separator may include a second lenslet array that is configured to focus the fluorescence light, and dispersion optics that are configured to receive the fluorescence light from the second lenslet array and to spatially disperse spectral components of the fluorescence light. The second lenslet array may include a plurality of linear arrays of lenslets that are configured to receive the fluorescence light as a plurality of parallel lines.

In other embodiments, the channel separator may include dispersion optics that are configured to spatially disperse spectral components of the fluorescence light, and a second lenslet array that is configured to receive the fluorescence light from the dispersion optics and to focus the fluorescence light. The second lenslet array may include a plurality of linear arrays of lenslets that are configured to receive the fluorescence light as a plurality of parallel lines.

The system may also include a dichroic beamsplitter that is configured to reflect the excitation light from the excitation light source toward the objective, and to transmit the fluorescence light from the sample toward the channel separator. A transmission spectrum of the dichroic beamsplitter may include a plurality of notches that coincide with the different wavelengths from the light sources.

According to yet another aspect of the invention, a system includes an excitation light source that is configured to emit excitation light; an objective that is configured to receive the excitation light from the excitation light source and image the excitation light onto the sample, such that the excitation light causes the sample to emit fluorescence light; a channel separator that is configured to receive the fluorescence light from the sample and separate the fluorescence light into a plurality of spatially dispersed spectral channels; and a sensor that is configured to receive the plurality of spatially dispersed spectral channels from the channel separator. The excitation light source includes a plurality of light sources, wherein each of the plurality of light sources emits light having a different wavelength, and a plurality of first lenslet arrays, wherein each of the plurality of first lenslet arrays is configured to receive light from one of the plurality of light sources and to generate a pattern of light, and the patterns of light generated by the plurality of first lenslet arrays are combined to form the excitation light. The objective is configured to simultaneously image the patterns of light to form a plurality of parallel lines or an array of circular spots at a plurality of depths of the sample.

In some embodiments, the channel separator includes a reflective layer having a plurality of first reflective elements, wherein each first reflective element of the plurality of first reflective elements is configured to reflect a first portion of the fluorescence light that is generated by a first pattern of light of the patterns of light; a patterned layer that is configured to transmit a second portion of the fluorescence light that is generated by a second pattern of light of the patterns of light; first dispersion optics that are configured to receive the first portion of the fluorescence light from the reflective layer and to spatially disperse spectral components of the first portion of the fluorescence light; and second dispersion optics that are configured to receive the second portion of the fluorescence light from the reflective layer and to spatially disperse spectral components of the second portion of the fluorescence light.

In other embodiments, the channel separator includes a second lenslet array that is configured to focus the fluorescence light, and dispersion optics that are configured to receive the fluorescence light from the second lenslet array and to spatially disperse spectral components of the fluorescence light. The second lenslet array may include a plurality of linear arrays of lenslets that are configured to receive the fluorescence light as a plurality of parallel lines.

In other embodiments, the channel separator includes dispersion optics that are configured to spatially disperse spectral components of the fluorescence light, and a second lenslet array that is configured to receive the fluorescence light from the dispersion optics and to focus the fluorescence light. The second lenslet array includes a plurality of linear arrays of lenslets that are configured to receive the fluorescence light as a plurality of parallel lines.

The system may also include a dichroic beamsplitter that is configured to reflect the excitation light from the excitation light source toward the objective, and to transmit the fluorescence light from the sample toward the channel separator. A transmission spectrum of the dichroic beamsplitter may include a plurality of notches that coincide with the different wavelengths from the light sources.

In some embodiments, a number of the plurality of light sources may equal a number of the plurality of first lenslet arrays. In other embodiments, a number of the plurality of light sources may be less than a number of the plurality of first lenslet arrays.

Other objects, advantages, and novel features of the present invention will become apparent from the following detailed description of the invention when considered in conjunction with the accompanying drawings.

BRIEF DESCRIPTION OF THE DRAWINGS

The present disclosure is described in conjunction with the appended figures:

FIG. 2(d) shows the illumination patterns of FIG. 2(c) in further detail;

FIG. 7 shows a diagram of an example of an excitation/emission separator;

DETAILED DESCRIPTION OF THE INVENTION

Figure 1:
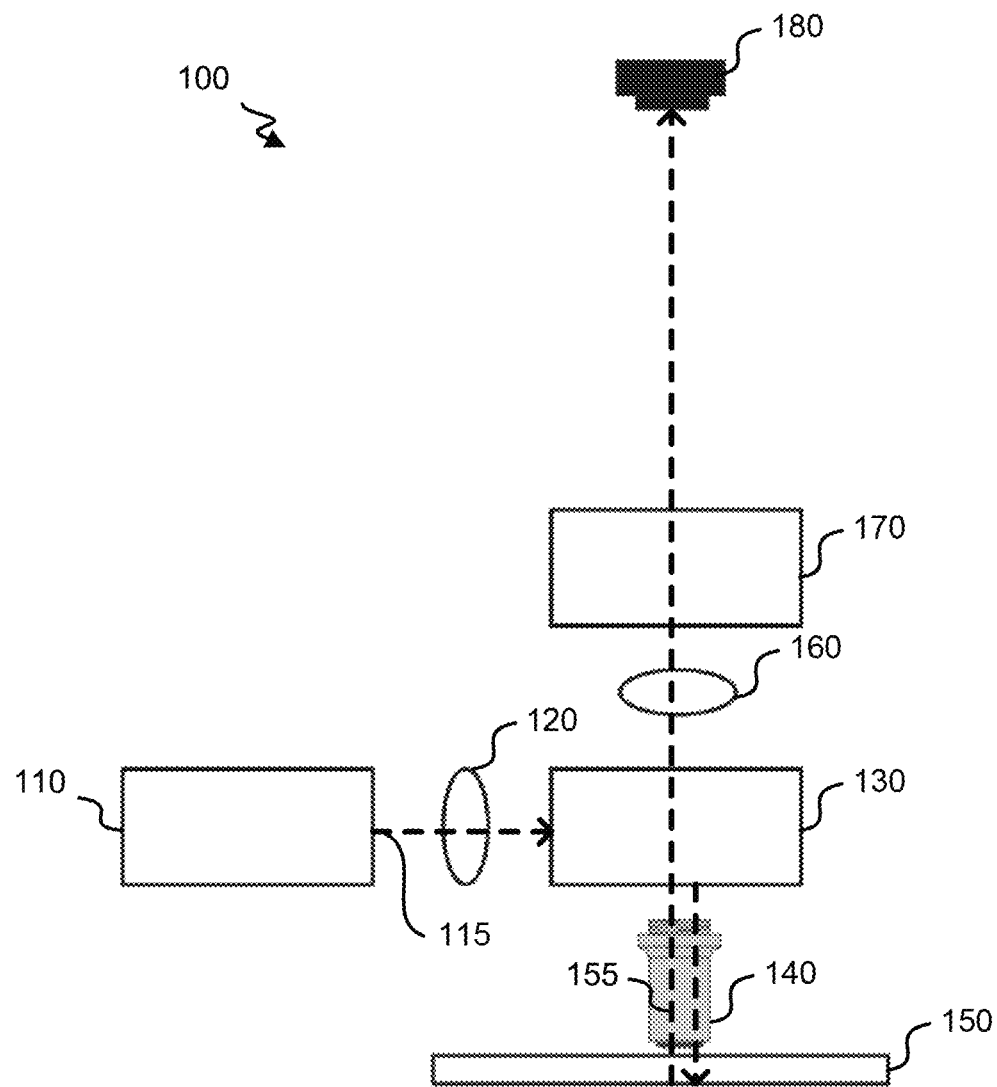
FIG. 1 shows a block diagram of a high-throughput hyperspectral imaging system according to exemplary embodiments of the invention.

FIG. 1 shows a block diagram of a high-throughput hyperspectral imaging system 100 according to exemplary embodiments of the invention. The high-throughput hyperspectral imaging system 100 shown in FIG. 1 may acquire data in three, four, or five dimensions. As discussed above, three-dimensional imaging data is acquired for two spatial dimensions (x,y) and one spectral dimension ($\lambda$) of the emission light. Four-dimensional imaging data adds either the excitation wavelength or the depth where the excitation light is focused on the sample as the fourth dimension. Five-dimensional imaging data adds both the excitation wavelength and the depth where the excitation light is focused on the sample. Advantageously all of the dimensions may be scanned simultaneously, thereby increasing the throughput of the hyperspectral imaging system 100.

As shown in FIG. 1, the system 100 includes an excitation light source 110 that emits excitation light 115. The excitation light source 110 may include a single light source that emits light at a single wavelength, or a plurality of light sources that emit light at different wavelengths. The light sources may be lasers, light-emitting diodes (LEDs), or any other suitable source of light for hyperspectral imaging. The excitation light source 100 may also include a single lenslet array or a plurality of lenslet arrays. The positions of each of the lenslet arrays may be adjusted to select the depth of the sample 150 at which light passing through the respective lenslet array is focused. Each of the lenslet arrays may include a plurality of parallel cylindrical lens elements or a two-dimensional matrix of circular lens elements. A lenslet array having the plurality of parallel cylindrical lens elements generates a pattern of light that is imaged on the sample 150 as a series of parallel lines. In contrast, a lenslet array having the two-dimensional matrix of circular lens elements generates a pattern of light that is imaged on the sample 150 as a two-dimensional matrix of circular spots.

As shown in FIG. 1, the excitation light 115 may be collimated by a first tube lens 120 and transmitted to an excitation/emission separator 130. As discussed in further detail below, the excitation/emission separator 130 may reflect the excitation light 115 toward the sample 150. An objective 140 then images the excitation light 115 onto the sample 150. When the excitation light 115 is incident on the sample 150, the excitation light 115 causes the sample 150 to emit fluorescence light 155. If the sample 150 is labeled with fluorophores, the fluorescence light 155 may be emitted by the fluorophores. Alternatively or in addition, the fluorescence light 155 may be autofluorescence light from the sample 150. Although the system 100 shown in FIG. 1 is configured to operate in an epi-illumination mode in which the excitation light 115 is incident on the sample 150 from above, the system 100 could be modified to operate in a transillumination mode in which the excitation light 115 is transmitted through the sample 150 from below. In this embodiment, the excitation/emission separator 130 may be removed from the system 100, or it may be replaced by a single-notch, long-pass, or multi-notch filter that blocks the excitation light 115 that is transmitted through the sample 150. In this embodiment, the sample 150 should be thin enough to transmit the excitation light 115 through the depth of the sample, such that sufficient fluorescence light 155 is emitted toward the objective 140.

After passing through the objective 140, the fluorescence light 155 may be transmitted by the excitation/emission separator 130, which blocks the further transmission of the excitation light 115. The fluorescence light 155 may then be focused by a second tube lens 160 onto a channel separator 170. As discussed in further detail below, the channel separator 170 separates the fluorescence light 155 into a plurality of spatially dispersed spectral channels, which are incident on the sensor 180. Although only one sensor 180 is shown, the system 100 may include a plurality of sensors 180. For example, each of the plurality of sensors 180 may receive the portion of the fluorescence light 155 that was generated by a single wavelength of the excitation light 115.

Figure 2A:
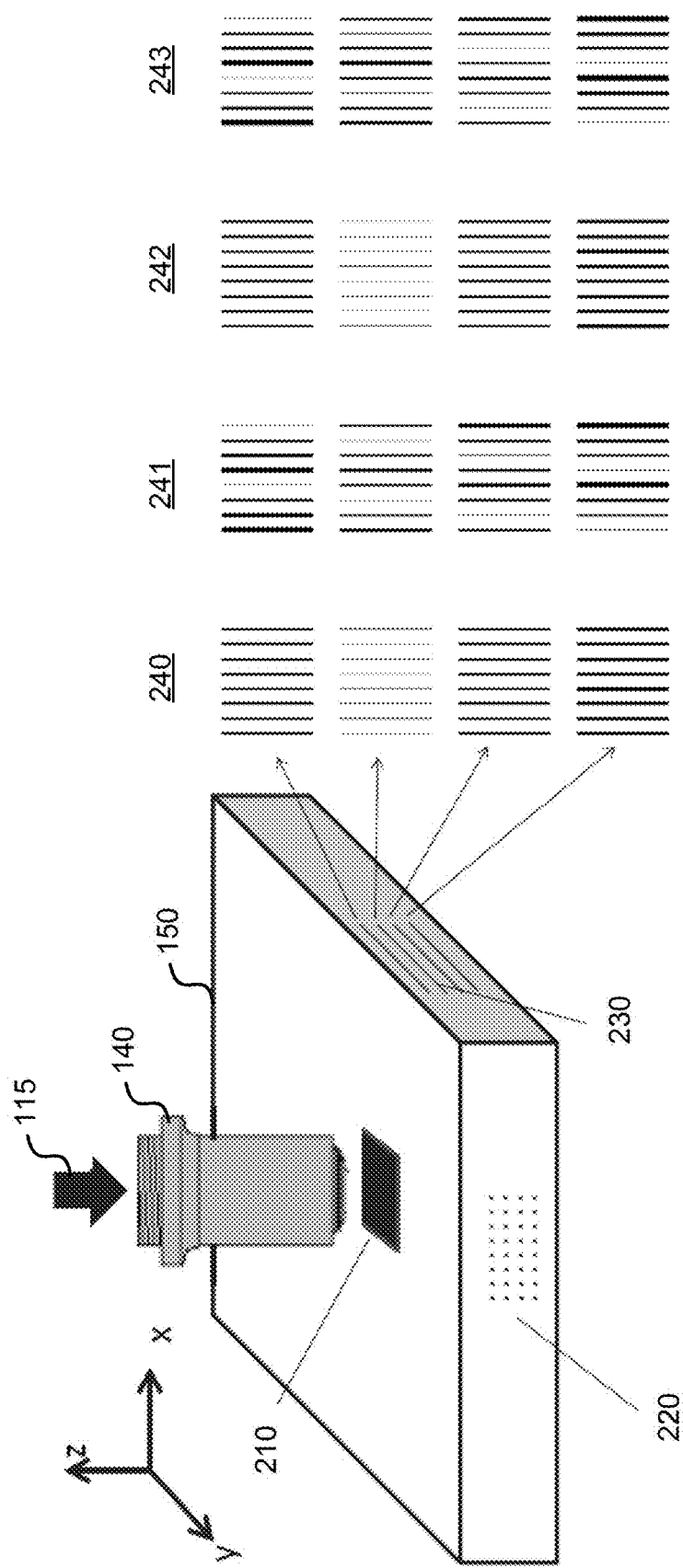
FIG. 2(a) shows a diagram of various illumination patterns that may be produced on the sample by the high-throughput hyperspectral imaging system that uses a cylindrical lenslet array within the excitation light source.

FIG. 2(a) shows a diagram of various illumination patterns that may be produced on the sample 150 by the high-throughput hyperspectral imaging system 100. This embodiment uses a cylindrical lenslet array within the excitation light source 110. As shown in FIG. 2(a), the excitation light 115 is incident on an excitation area 210 of the sample 150. The excitation light 115 may be focused at various depths along the z direction of the sample 150. For example, FIG. 2(a) shows a first projection 220 of the illumination on the x-z plane for several z slices. Similarly, FIG. 2(a) shows a second projection 230 of the illumination on the y-z plane for several z slices. The thicknesses of the lines within illumination patterns 240, 241, 242, and 243 represent the widths of the lines of the excitation light 115 at different depths of the sample 150. The focus of the excitation light 115 is shown as the thinnest lines. For example, the second row of illumination pattern 242 shows where the excitation light 115 is focused on the sample. The other rows of illumination pattern 242 show how the widths of the lines are different at different axial positions.

Figure 2B:
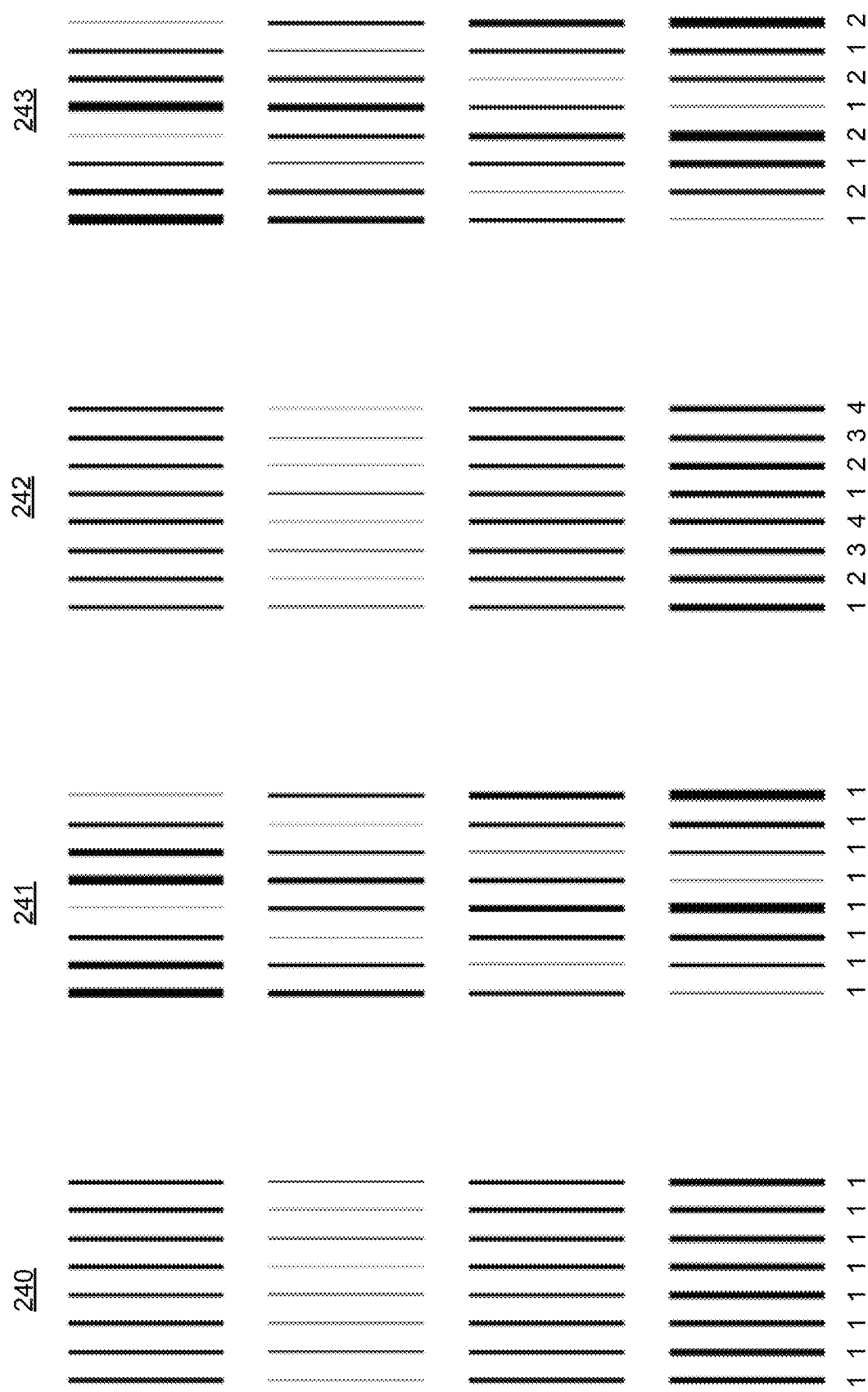
FIG. 2(b) shows the illumination patterns of FIG. 2(a) in further detail.

FIG. 2(b) shows illumination patterns 240, 241, 242, and 243 of the second projection 230 in further detail for various embodiments. The numbers beneath illumination patterns 240, 241, 242, and 243 indicate the wavelength of the excitation light 115. For example, a first wavelength (labeled as "1") is used for illumination patterns 240 and 241, while a second wavelength (labeled as "2"), a third wavelength (labeled as "3", and a fourth wavelength (labeled as "4") are used for illumination pattern 242. Each of the wavelengths may have any suitable value. Specifically, illumination pattern 240 corresponds to three-dimensional imaging in which there are two spatial dimensions and one spectral dimension of the emission light. Illumination pattern 240 may be obtained by using a single light source that emits a single wavelength with a single lenslet array in the excitation light source 110. Illumination pattern 241 corresponds to four-dimensional imaging in which there are two spatial dimensions and one spectral dimension of the emission light, along with the depth where the excitation light is focused on the sample as the fourth dimension. Illumination pattern 241 may be obtained by using a single light source that emits a single wavelength with a plurality of lenslet arrays in the excitation light source 110. Alternatively, illumination pattern 241 may be obtained by using a single lenslet array in which adjacent lenslets have different focal lengths. Illumination pattern 242 corresponds to four-dimensional imaging in which there are two spatial dimensions and one spectral dimension of the emission light, along with the excitation wavelength as the fourth dimension. Illumination pattern 242 may be obtained by using a plurality of light sources that emit a plurality of wavelengths with a single lenslet array in the excitation light source 110. Illumination pattern 243 corresponds to five-dimensional imaging in which there are two spatial dimensions and one spectral dimension of the emission light, along with the depth where the excitation light is focused on the sample and the excitation wavelength as the fourth and fifth dimensions. Illumination pattern 243 may be obtained by using a plurality of light sources that emit a plurality of wavelengths with a plurality of lenslet arrays in the excitation light source 110.

Figure 2C:
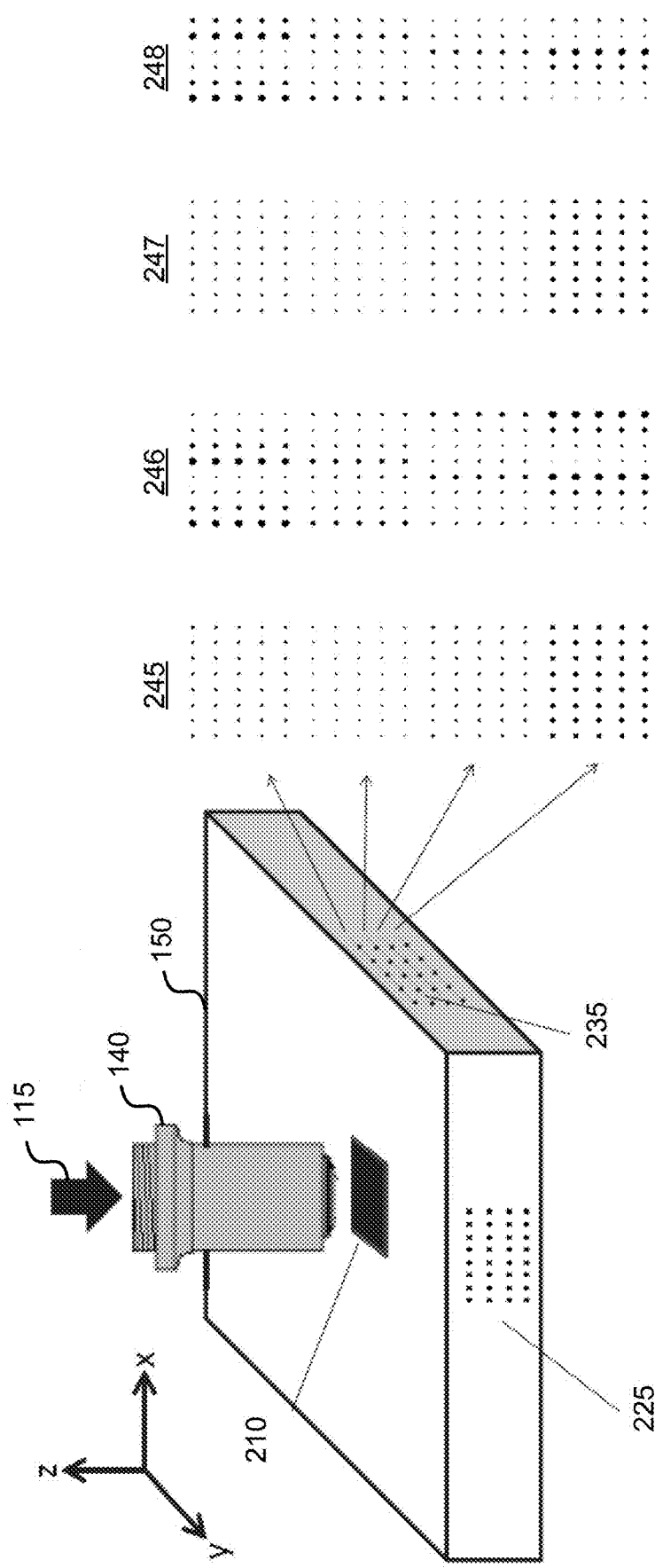
FIG. 2(c) shows a diagram of various illumination patterns that may be produced on the sample by the high-throughput hyperspectral imaging system that uses a circular lenslet array within the excitation light source.

FIG. 2(c) shows another diagram of various illumination patterns that may be produced on the sample 150 by the high-throughput hyperspectral imaging system 100. This embodiment uses a circular lenslet array within the excitation light source 110. As shown in FIG. 2(b), the excitation light 115 is incident on an excitation area 210 of the sample 150. The excitation light 115 may be focused at various depths along the z direction of the sample 150. For example, FIG. 2(b) shows a first projection 225 of the illumination on the x-z plane for several z slices. Similarly, FIG. 2(b) shows a second projection 235 of the illumination on the y-z plane for several z slices. The thicknesses of the lines within illumination patterns 245, 246, 247, and 248 represent the widths of the lines of the excitation light 115 at different depths of the sample 150. The focus of the excitation light 115 is shown as the thinnest lines. For example, the second row of illumination pattern 247 shows where the excitation light 115 is focused on the sample. The other rows of illumination pattern 247 show how the widths of the lines are different at different axial positions.

FIG. 2(d) shows illumination patterns 245, 246, 247, and 248 of the second projection 235 in further detail for various embodiments. The numbers beneath illumination patterns 245, 246, 247, and 248 indicate the wavelength of the excitation light 115. For example, a first wavelength (labeled as "1") is used for illumination patterns 245 and 246, while a second wavelength (labeled as "2"), a third wavelength (labeled as "3", and a fourth wavelength (labeled as "4") are used for illumination pattern 247. Each of the wavelengths may have any suitable value. Specifically, illumination pattern 245 corresponds to three-dimensional imaging in which there are two spatial dimensions and one spectral dimension of the emission light. Illumination pattern 245 may be obtained by using a single light source that emits a single wavelength with a single lenslet array in the excitation light source 110. Illumination pattern 246 corresponds to four-dimensional imaging in which there are two spatial dimensions and one spectral dimension of the emission light, along with the depth where the excitation light is focused on the sample as the fourth dimension. Illumination pattern 246 may be obtained by using a single light source that emits a single wavelength with a plurality of lenslet arrays in the excitation light source 110. Alternatively, illumination pattern 246 may be obtained by using a single lenslet array in which adjacent lenslets have different focal lengths. Illumination pattern 247 corresponds to four-dimensional imaging in which there are two spatial dimensions and one spectral dimension of the emission light, along with the excitation wavelength as the fourth dimension. Illumination pattern 247 may be obtained by using a plurality of light sources that emit a plurality of wavelengths with a single lenslet array in the excitation light source 110. Illumination pattern 248 corresponds to five-dimensional imaging in which there are two spatial dimensions and one spectral dimension of the emission light, along with the depth where the excitation light is focused on the sample and the excitation wavelength as the fourth and fifth dimensions. Illumination pattern 248 may be obtained by using a plurality of light sources that emit a plurality of wavelengths with a plurality of lenslet arrays in the excitation light source 110.

In order to generate a hyperspectral data cube, the sample 150 may be scanned along the x direction shown in FIG. 2(a) for embodiments that use cylindrical lenslet arrays within the excitation light source 100. Alternatively, the lenslet arrays within the excitation light source 110 may be scanned along the x direction for these embodiments. For illumination pattern 241, no additional scanning is needed if only one excitation wavelength is needed, provided that the axial resolution and range of focal depths are such that all the desired depth slices of the sample can be interrogated simultaneously. On the other hand, if the spacing is more sparse, such as if the spacing between the rows in illumination pattern 241 is 30 μm and the axial resolution is 3 μm, and data is desired at steps greater than 30 μm steps, the depth may also be scanned by moving the sample 150 or the lenslet arrays axially. If more than one excitation wavelength is required, then the excitation wavelength would be changed for all lines. For illumination pattern 242, no additional scanning is needed if the sample 150 is very thin and only one depth is needed. However, if an axial scan is needed, then the sample 150 may be scanned along the z direction. For illumination pattern 243, the sample 150 may be scanned along the z direction. It should be noted that the information content obtained per scan is the same for each of the illumination patterns 240, 241, 242, and 243. Therefore, the choice of which illumination pattern to use may depend on the characteristics of the sample 150 and what kind of information is desired. For example, for a sufficiently thin sample 150, depth scanning may not be required. If information from only one depth is needed, then illumination pattern 242 may be used. Further, for a thick sample 150 with a family of fluorophores only excited by a single wavelength, wavelength scanning may not be required. If information from only one excitation wavelength is needed, illumination pattern 241 may be used. If information from an instantaneous coarse snapshot at a few excitation wavelengths and a few depths is needed, illumination pattern 243 may be used.

For embodiments that use circular lenslet arrays within the excitation light source 110, the sample 150 may be scanned along the y direction shown in FIG. 2(b). Alternatively, the lenslet arrays within the excitation light source 110 may be scanned along the y direction for these embodiments. For illumination pattern 246, no additional scanning is needed if only one excitation wavelength is needed, provided that the axial resolution and range of focal depths are such that all the desired depth slices of the sample can be interrogated simultaneously. On the other hand, if the spacing is more sparse, such as if the spacing between the rows in illumination pattern 246 is 30 μm and the axial resolution is 3 μm, and data is desired at steps greater than 30 μm steps, the depth may also be scanned by moving the sample 150 or the lenslet arrays axially. If more than one excitation wavelength is required, then the excitation wavelength would be changed for all lines. For illumination pattern 247, no additional scanning is needed if the sample 150 is very thin and only one depth is needed. However, if an axial scan is needed, then the sample 150 may be scanned along the z direction. For illumination pattern 248, the sample 150 may be scanned along the z direction. It should be noted that the information content obtained per scan is the same for each of the illumination patterns 245, 246, 247, and 248. Therefore, the choice of which illumination pattern to use may depend on the characteristics of the sample 150 and what kind of information is desired. For example, for a sufficiently thin sample 150, depth scanning may not be required. If information from only one depth is needed, then illumination pattern 247 may be used. Further, for a thick sample 150 with a family of fluorophores only excited by a single wavelength, wavelength scanning may not be required. If information from only one excitation wavelength is needed, illumination pattern 246 may be used. If information from an instantaneous coarse snapshot at a few excitation wavelengths and a few depths is needed, illumination pattern 248 may be used.

FIGS. 3(a)-3(d) show a diagram of an excitation light source that may be used to produce illumination pattern 241 for four-dimensional imaging in which there are two spatial dimensions and one spectral dimension of the emission light, along with the depth where the excitation light is focused on the sample as the fourth dimension. The excitation light source 300 may include a light source 310 that emits light 315 at a single wavelength. As shown in FIGS. 3(a)-3(d), the light 315 may be divided into four different paths, such that each path travels through a different lenslet array. Light from the four paths is then combined at the non-polarizing beamsplitter 360 to form the excitation light 115. Although FIGS. 3(a)-3(d) show a specific example for dividing and recombining the light, any suitable components and layout may be used.

Figure 3A:
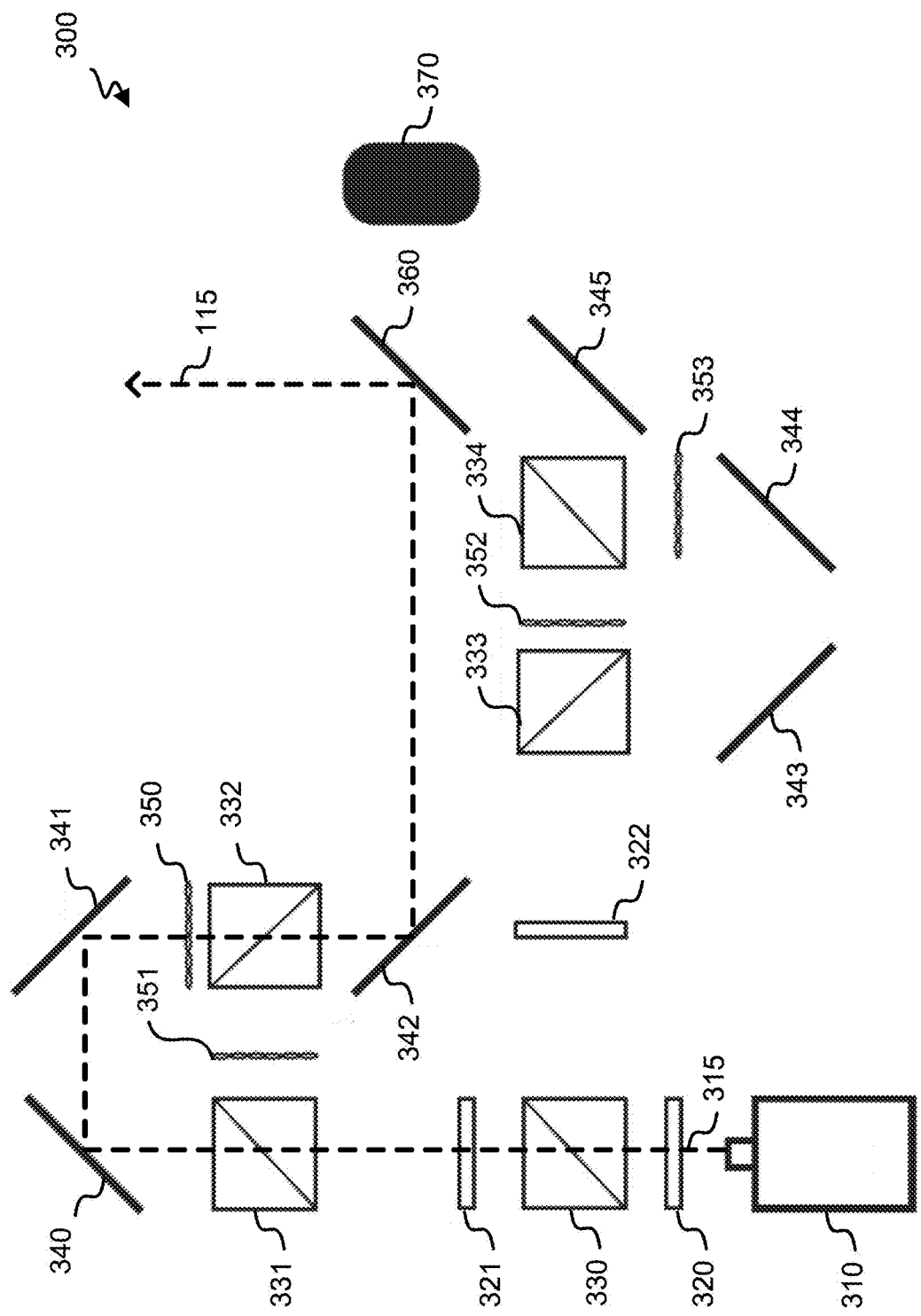
FIGS. 3(a)-3(d) show diagrams of an excitation light source that may be used to produce an illumination pattern for four-dimensional imaging in which the dimensions include two spatial dimensions and one spectral dimension of the emission light, along with the depth where the excitation light is focused on the sample.

For example, as shown in FIG. 3(a), a first portion of the light 315 passes through a half-wave plate 320, a polarizing beamsplitter 330, a half-wave plate 321, and a polarizing beamsplitter 331. The first portion of the light 315 is then reflected by two reflectors 340 and 341, and passes through a first lenslet array 350. The first portion of the light 315 then passes through polarizing beamsplitter 332 and is reflected by reflector 342 and non-polarizing beamsplitter 360 to form part of the excitation light 115. A dump 370 is included to absorb any extra light that is transmitted through the non-polarizing beamsplitter 360.

Figure 3B:
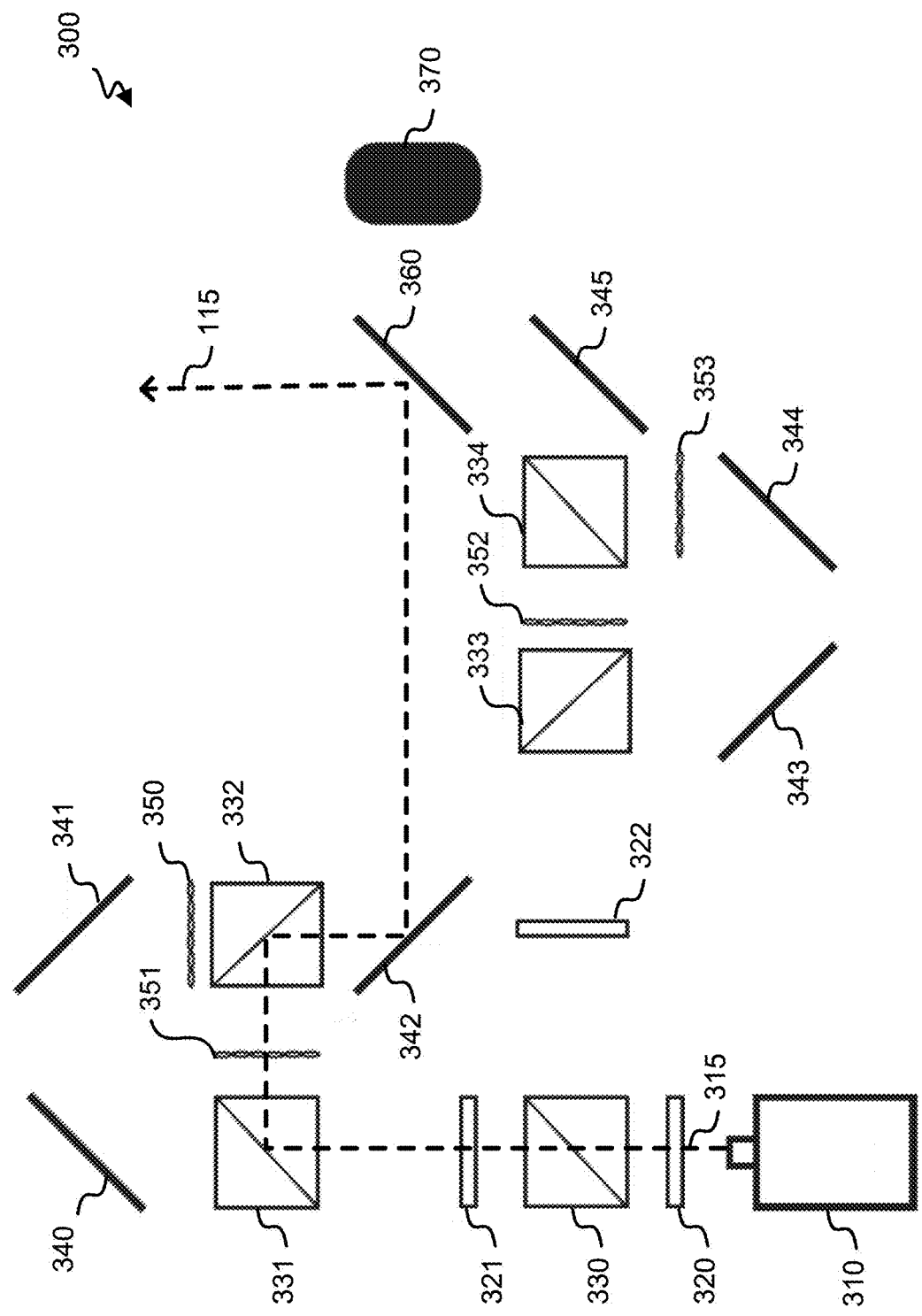

Further, as shown in FIG. 3(b), a second portion of the light 315 passes through the half-wave plate 320, the polarizing beamsplitter 330, and the half-wave plate 321. The second portion of the light 315 is then reflected by the polarizing beamsplitter 331, and passes through a second lenslet array 351. The second portion of the light is then reflected by the polarizing beamsplitter 332, the reflector 342, and the non-polarizing beamsplitter 360 to form part of the excitation light 115.

Figure 3C:
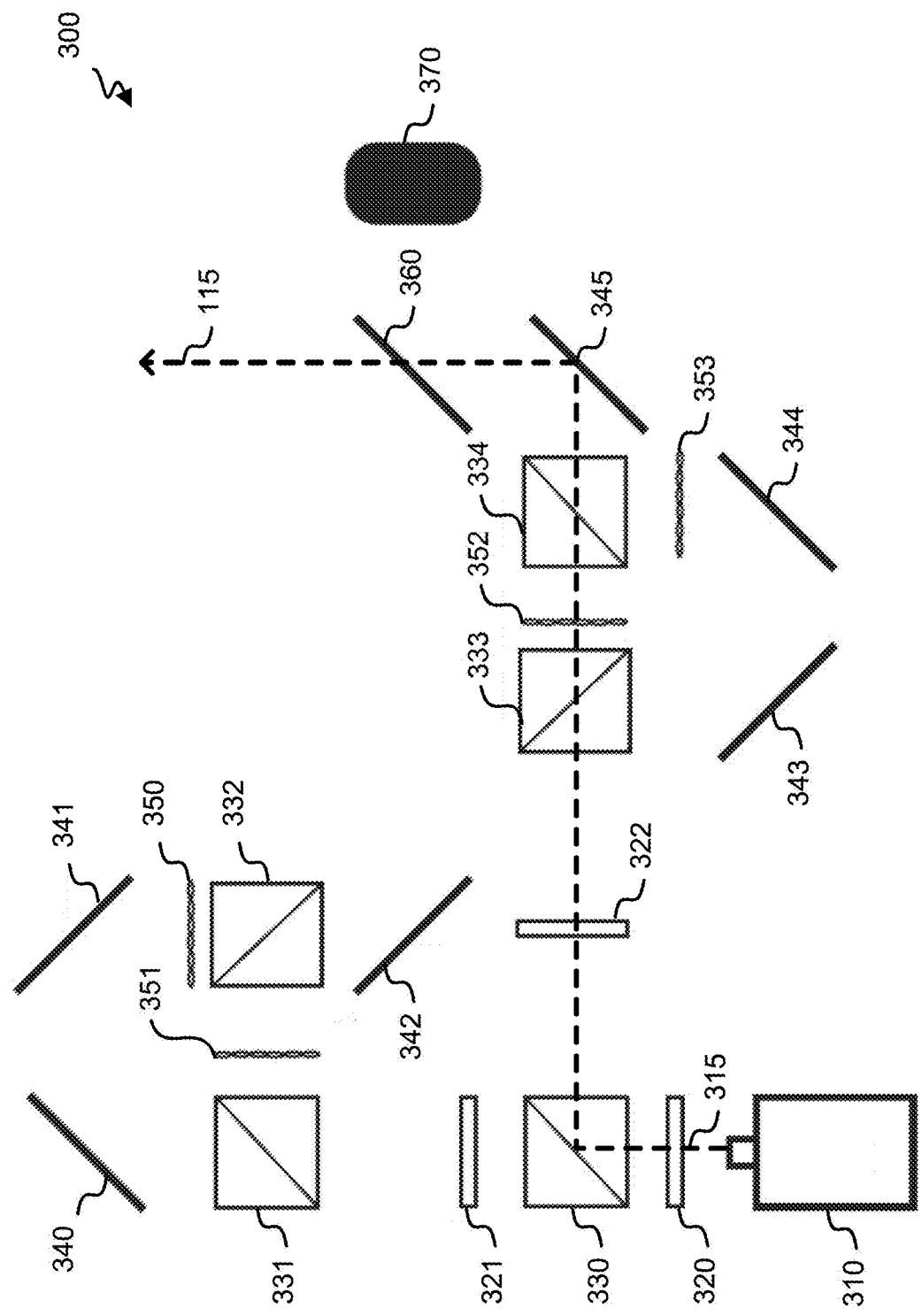

In addition, as shown in FIG. 3(c), a third portion of the light 315 passes through the half-wave plate 320 and is reflected by the polarizing beamsplitter 330. The third portion of the light 315 then passes through a half-wave plate 322, a polarizing beamsplitter 333, a third lenslet array 352, and a polarizing beamsplitter 334. Next the third portion of the light 315 is reflected by a reflector 345 and passes through the non-polarizing beamsplitter 360 to form part of the excitation light 115.

Figure 3D:
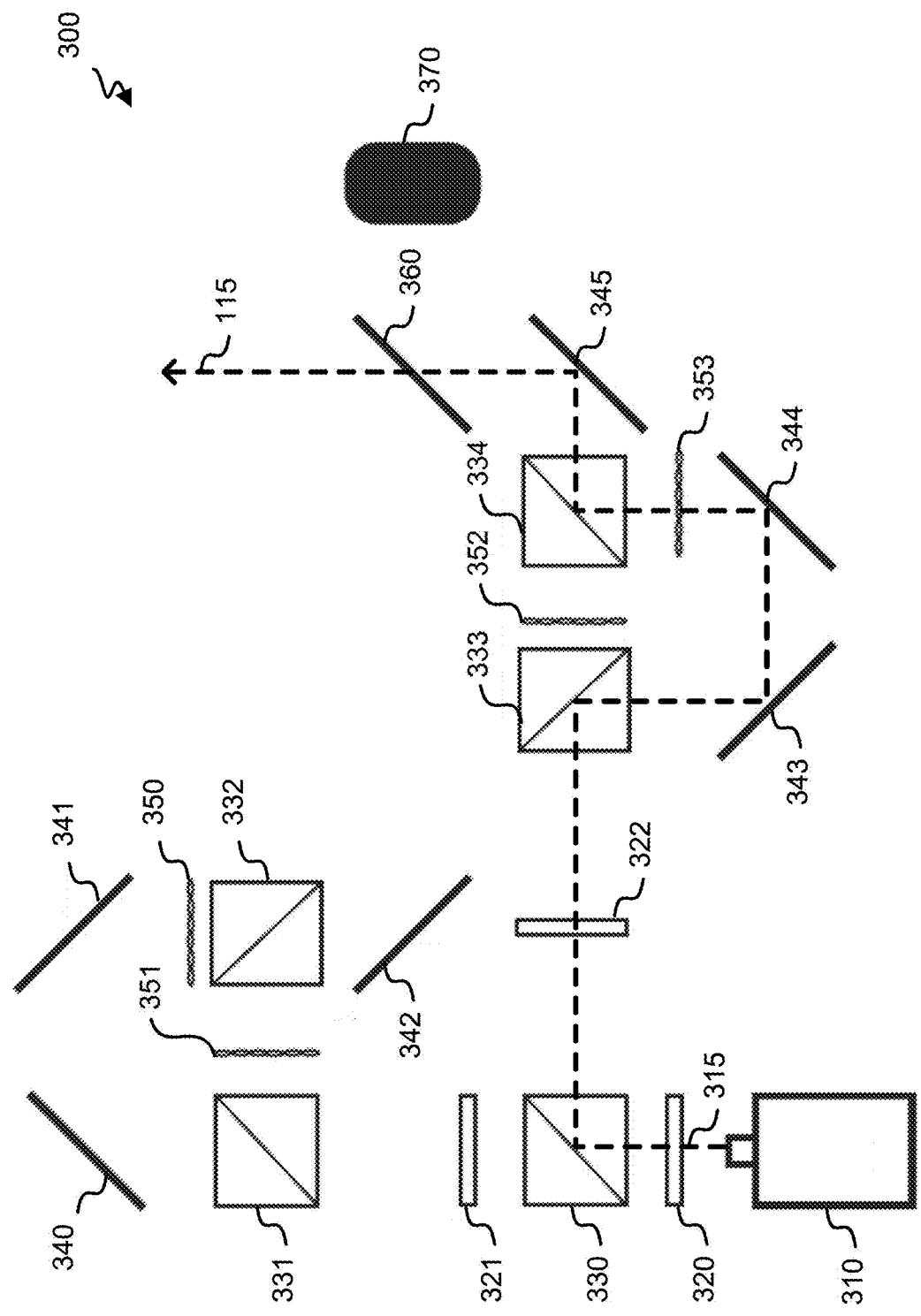

Further, as shown in FIG. 3(d), a fourth portion of the light 315 passes through the half-wave plate 320 and is reflected by the polarizing beamsplitter 330. The fourth portion of the light 315 then passes through the half-wave plate 322 and is reflected by the polarizing beamsplitter 333. Next the fourth portion of the light is reflected by reflectors 343 and 344, passes through a fourth lenslet array 353, is reflected by the polarizing beamsplitter 334 and the reflector 345, and passes through the non-polarizing beamsplitter 360 to form part of the excitation light 115.

Figure 4:
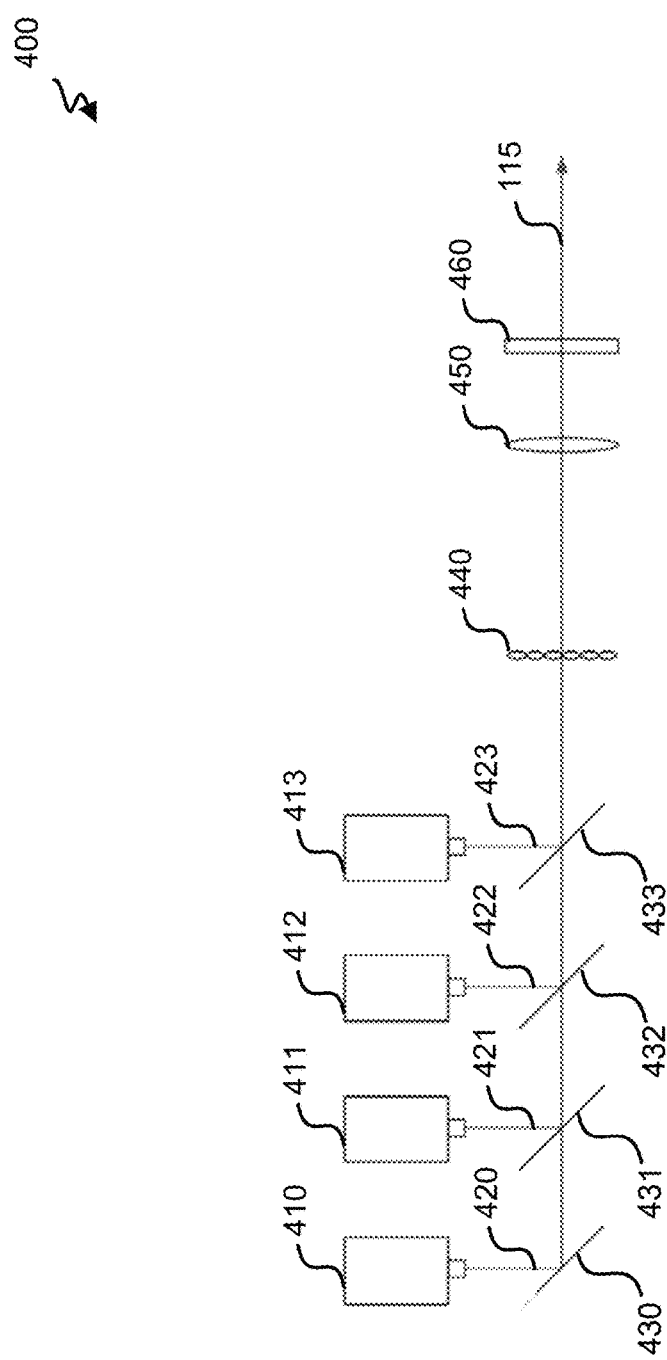
FIG. 4 shows a diagram of an excitation light source that may be used to produce an illumination pattern for four-dimensional imaging in which the dimensions include two spatial dimensions and one spectral dimension of the emission light, along with the excitation wavelength.

FIG. 4 shows a diagram of an excitation light source that may be used to produce illumination pattern 242 for four-dimensional imaging in which there are two spatial dimensions and one spectral dimension of the emission light, along with the excitation wavelength as the fourth dimension. The excitation light source 400 may include a plurality of light sources 410, 411, 412, and 413 that emit light 420, 421, 422, and 423, respectively, where each light 420, 421, 422, and 423 has a different wavelength. As shown in FIG. 4, the light 420, 421, 422, and 423 may be combined via dichroic mirrors 430, 431, 432, and 433 before reaching a single lenslet array 440. The combined light is then collimated by a tube lens 450 and dispersed by a dispersing element 460, such as a prism or a grating, to form the excitation light 115. Although FIG. 4 shows a specific example for combining the light 420, 421, 422, and 423, any suitable components and layout may be used.

FIGS. 5(a)-5(d) show a diagram of an excitation light source that may be used to produce illumination pattern 243 for five-dimensional imaging in which there are two spatial dimensions and one spectral dimension of the emission light, along with the depth where the excitation light is focused on the sample and the excitation wavelength as the fourth and fifth dimensions. The excitation light source 500 may include a plurality of light sources 510, 511, 512, and 513 that emit light 520, 521, 522, and 523 at different wavelengths. As shown in FIGS. 5(a)-5(d), each light 520, 521, 522, and 523 travels through a respective lenslet array 530, 531, 532, and 533. The light 520, 521, 522, and 523 is then combined at dichroic 541 to form the excitation light 115. Although FIGS. 5(a)-5(d) show a specific example for combining the light, any suitable components and layout may be used.

Figure 5A:
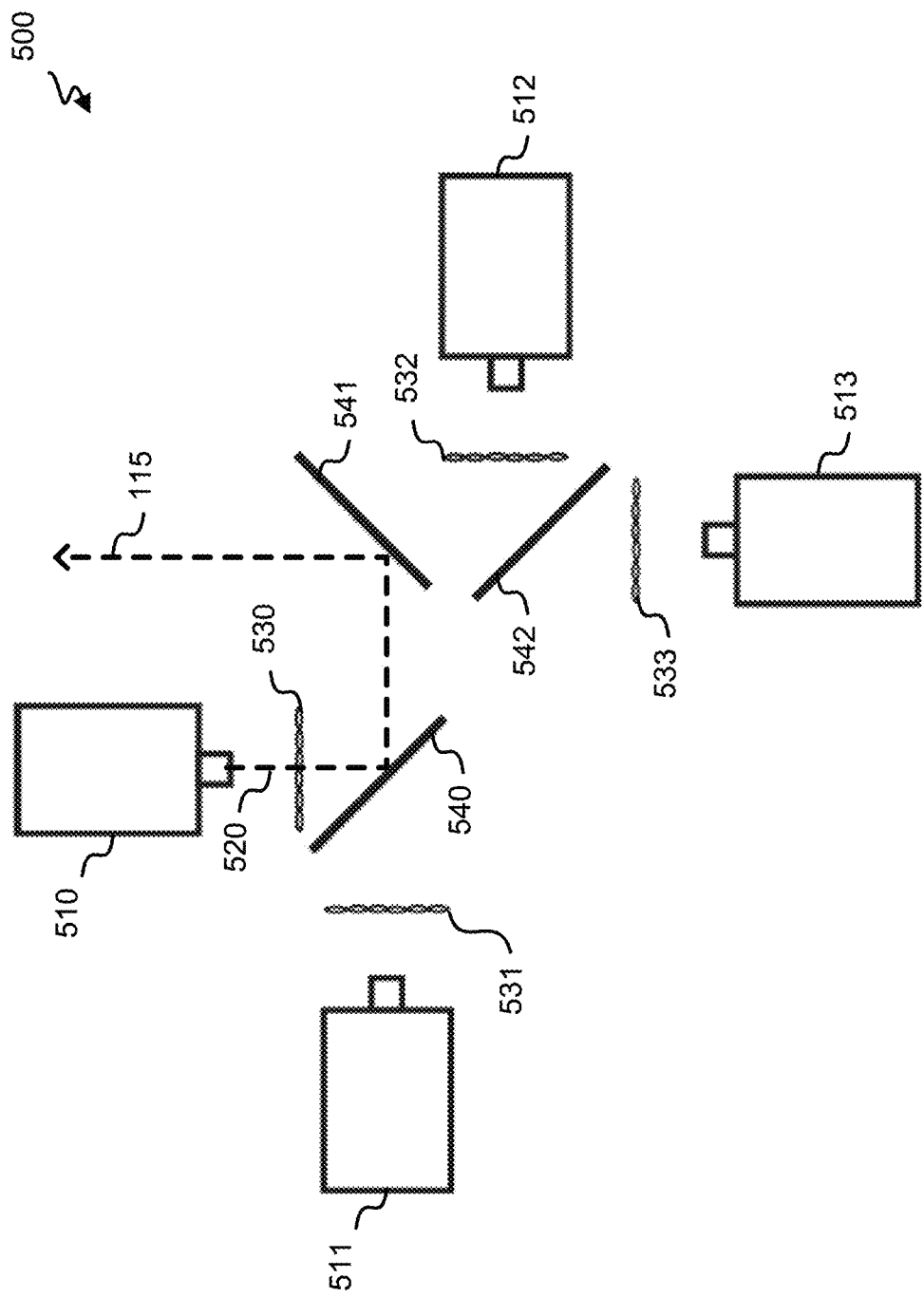
FIGS. 5(a)-5(d) show diagrams of an excitation light source that may be used to produce an illumination pattern for five-dimensional imaging in which the dimensions include two spatial dimensions and one spectral dimension of the emission light, along with the depth where the excitation light is focused on the sample and the excitation wavelength.
Figure 5B:
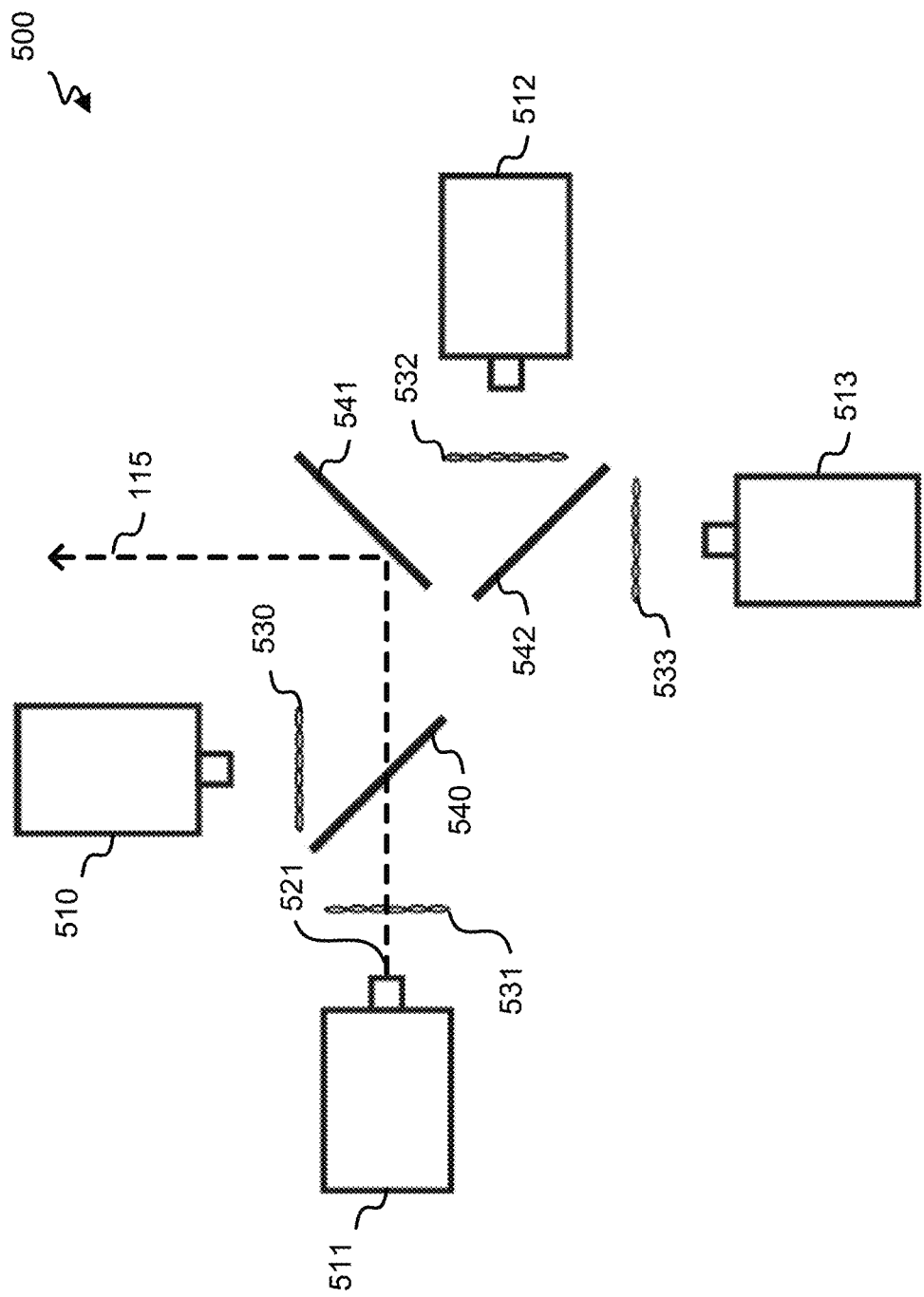
Figure 5C:
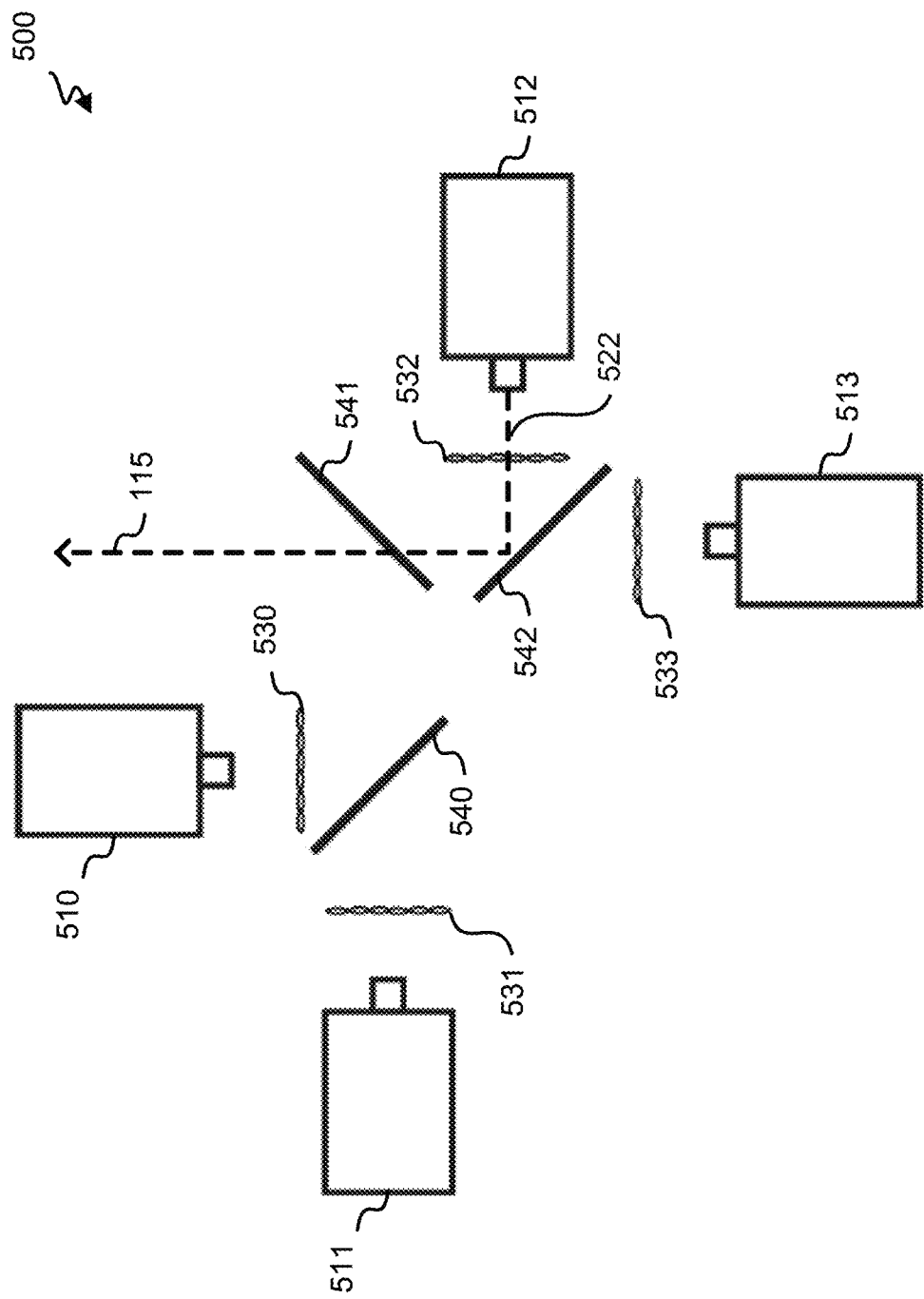
Figure 5D:
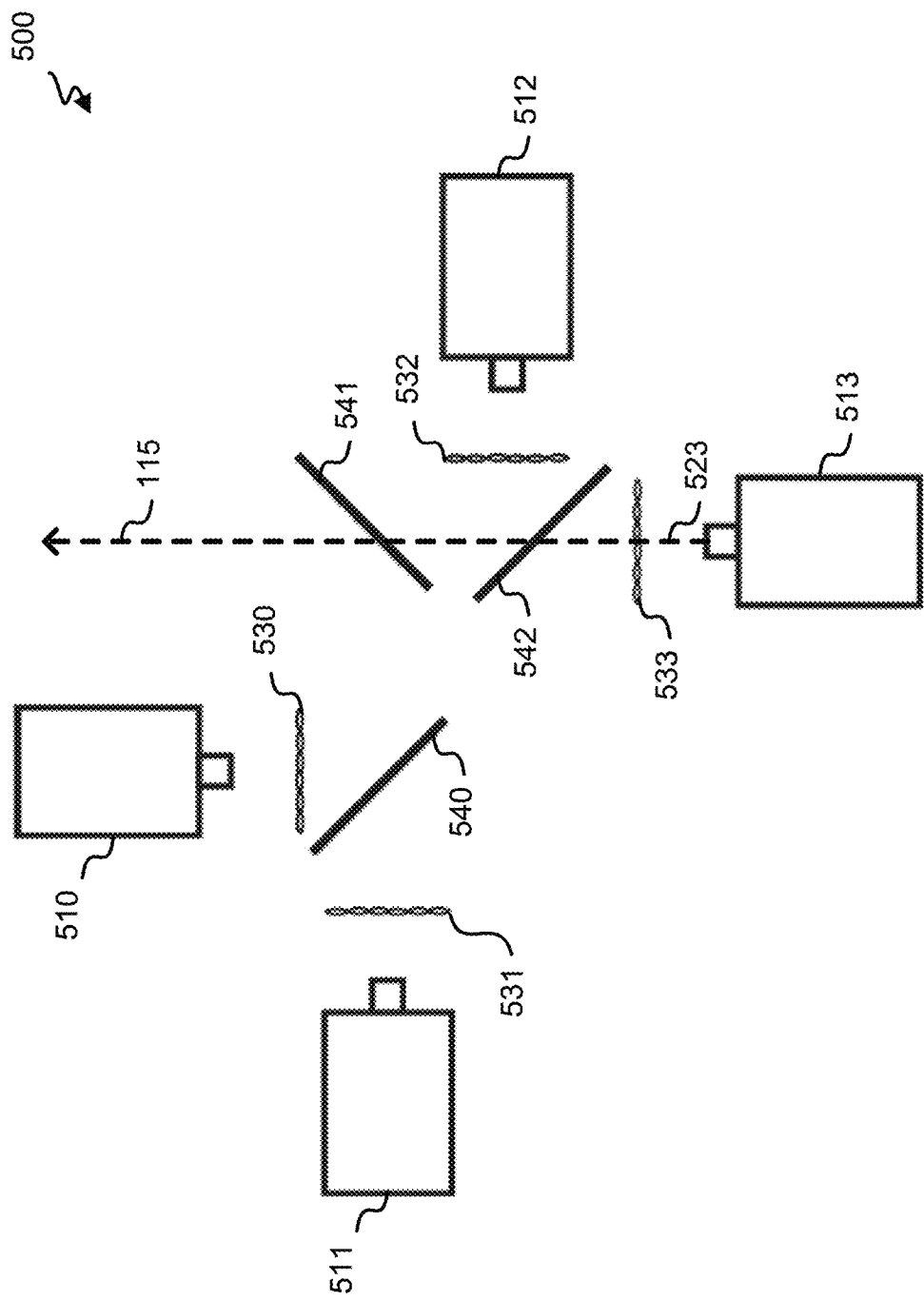

For example, as shown in FIG. 5(a), the light 520 from light source 510 passes through lenslet array 530 and is reflected by dichroics 540 and 541 to form part of the excitation light 115. As shown in FIG. 5(b), the light 521 from light source 511 passes through lenslet array 531 and dichroic 540, and is reflected by dichroic 541 to form part of the excitation light 115. As shown in FIG. 5(c), the light 522 from light source 512 passes through lenslet array 532, is reflected by dichroic 542, and passes through dichroic 541 to form part of the excitation light 115. As shown in FIG. 5(d), the light 523 from light source 513 passes through lenslet array 533, dichroic 542, and dichroic 541 to form part of the excitation light 115.

FIGS. 6(a)-6(d) show a diagram of another excitation light source that may be used to produce illumination pattern 243 for five-dimensional imaging in which there are two spatial dimensions and one spectral dimension of the emission light, along with the depth where the excitation light is focused on the sample and the excitation wavelength as the fourth and fifth dimensions. The excitation light source 600 may include a plurality of light sources 610 and 611 that emit light 620 and 621 at different wavelengths. As shown in FIGS. 6(a)-6(d), each light 620 and 621 is divided into two paths, such that each of the total of four paths travels through a different lenslet array. Light from the four paths is then combined at the dichroic 670 to form the excitation light 115. Although FIGS. 6(a)-6(d) show a specific example for dividing and recombining the light, any suitable components and layout may be used.

Figure 6A:
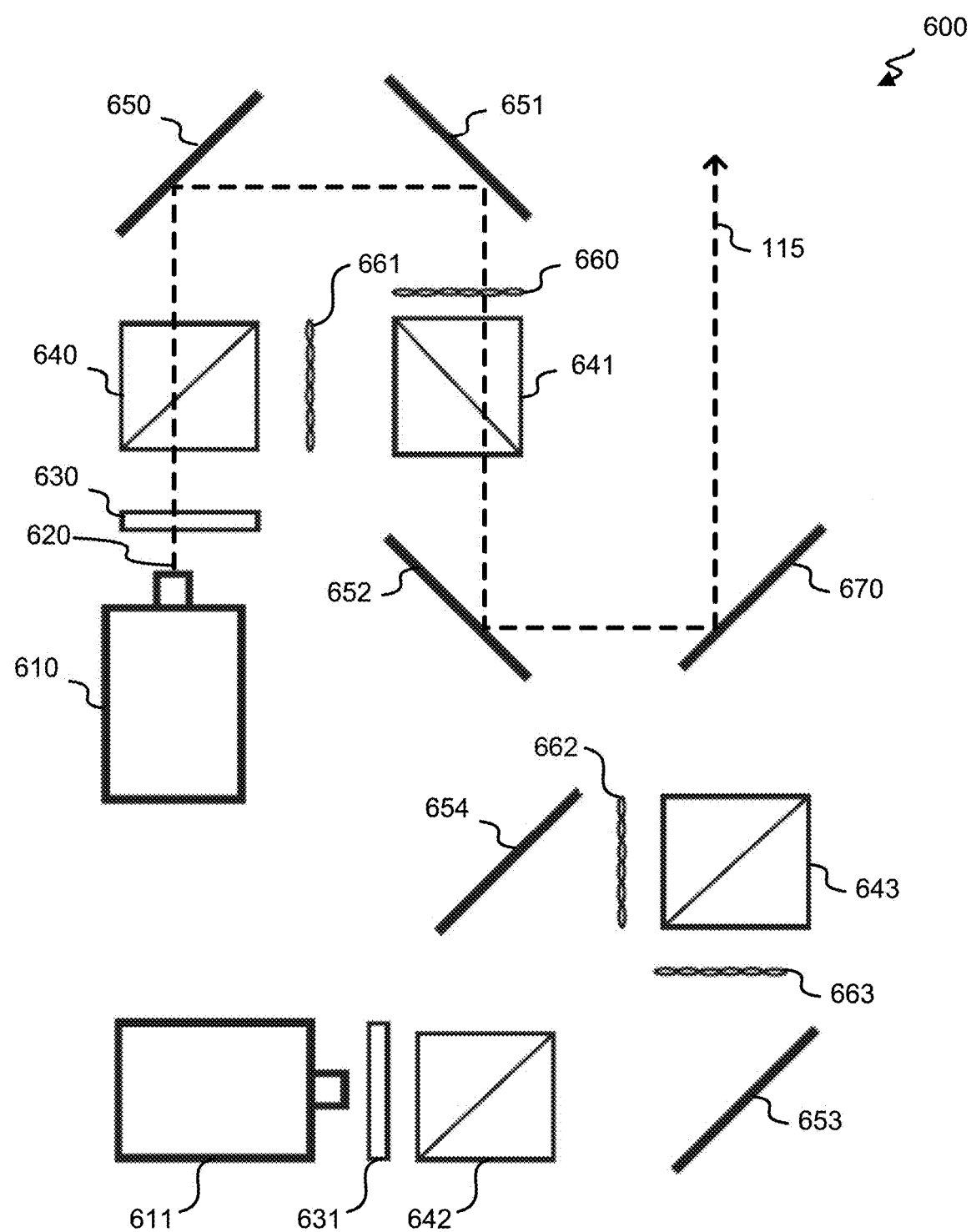
FIGS. 6(a)-6(d) show diagrams of another excitation light source that may be used to produce an illumination pattern for five-dimensional imaging in which the dimensions include two spatial dimensions and one spectral dimension of the emission light, along with the depth where the excitation light is focused on the sample and the excitation wavelength.

For example, as shown in FIG. 6(a), a portion of the light 620 from light source 610 passes through half-wave plate 630 and polarizing beamsplitter 640, is reflected by reflectors 650 and 651, and then passes through first lenslet array 660. The light then passes through polarizing beamsplitter 641 and is reflected by reflector 652 and dichroic 670 to form part of the excitation light 115.

Figure 6B:
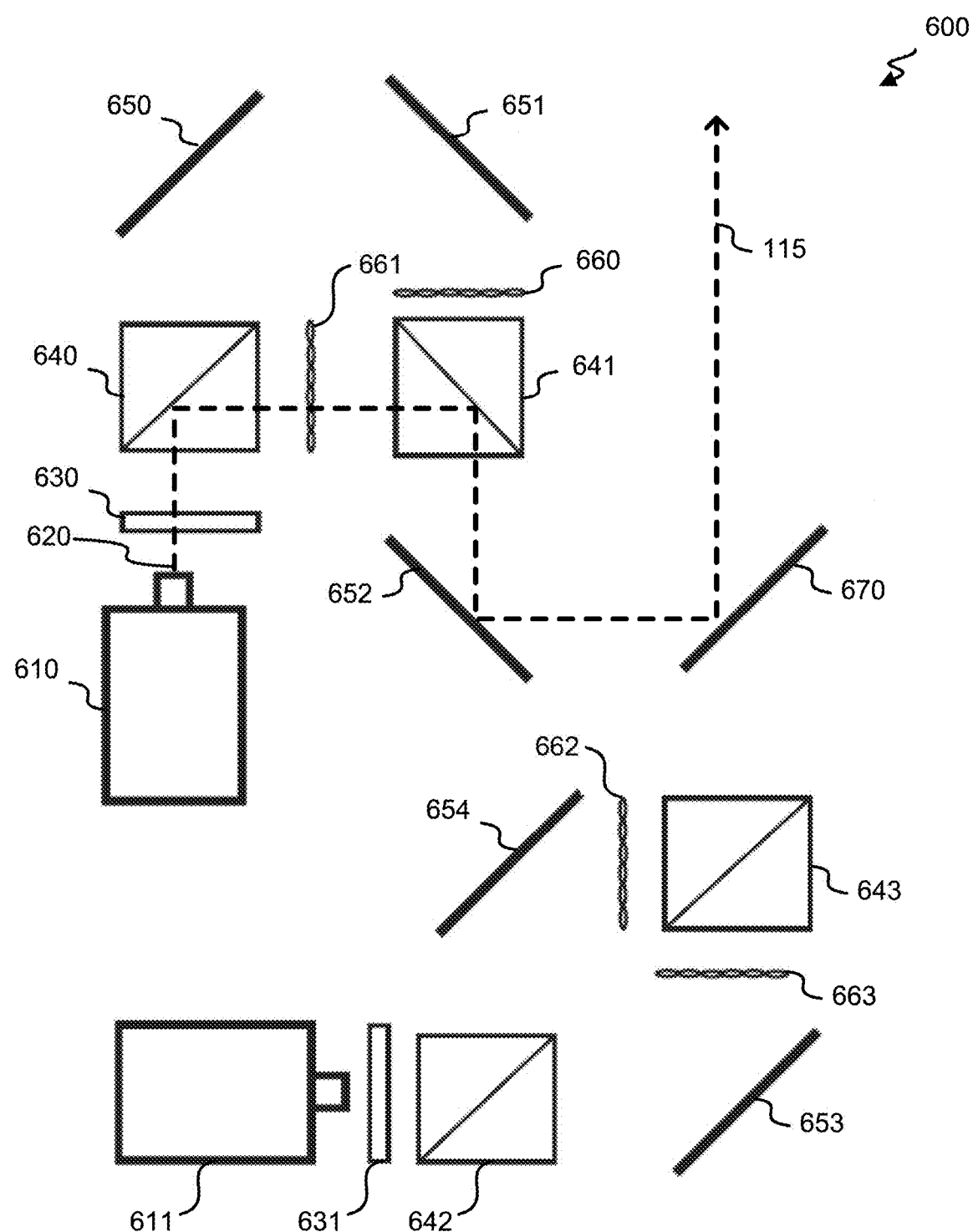

Further, as shown in FIG. 6(b), a portion of the light 620 from light source 610 passes through half-wave plate 630 and is reflected by the polarizing beamsplitter 640. The light then passes through second lenslet array 661. Next the light is reflected by the polarizing beamsplitter 641, the reflector 652, and the dichroic 670 to form part of the excitation light 115.

Figure 6C:
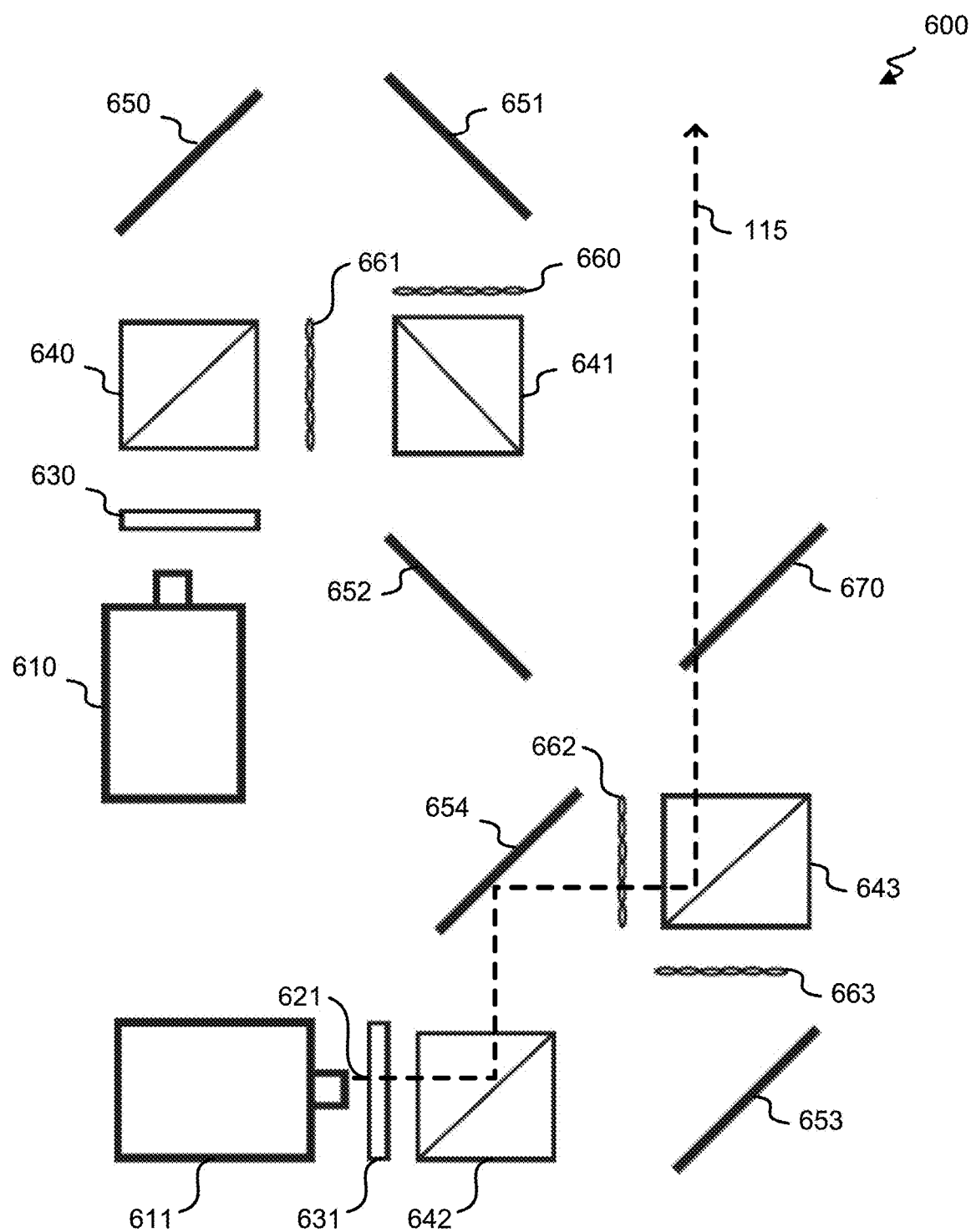

In addition, as shown in FIG. 6(c), a portion of the light 621 from light source 611 passes through half-wave plate 631 and is reflected by polarizing beamsplitter 642. The light is then reflected by reflector 654 and passes through third lenslet array 662. Next the light is reflected by polarizing beamsplitter 643 and passes through dichroic 670 to form part of the excitation light 115.

Figure 6D:
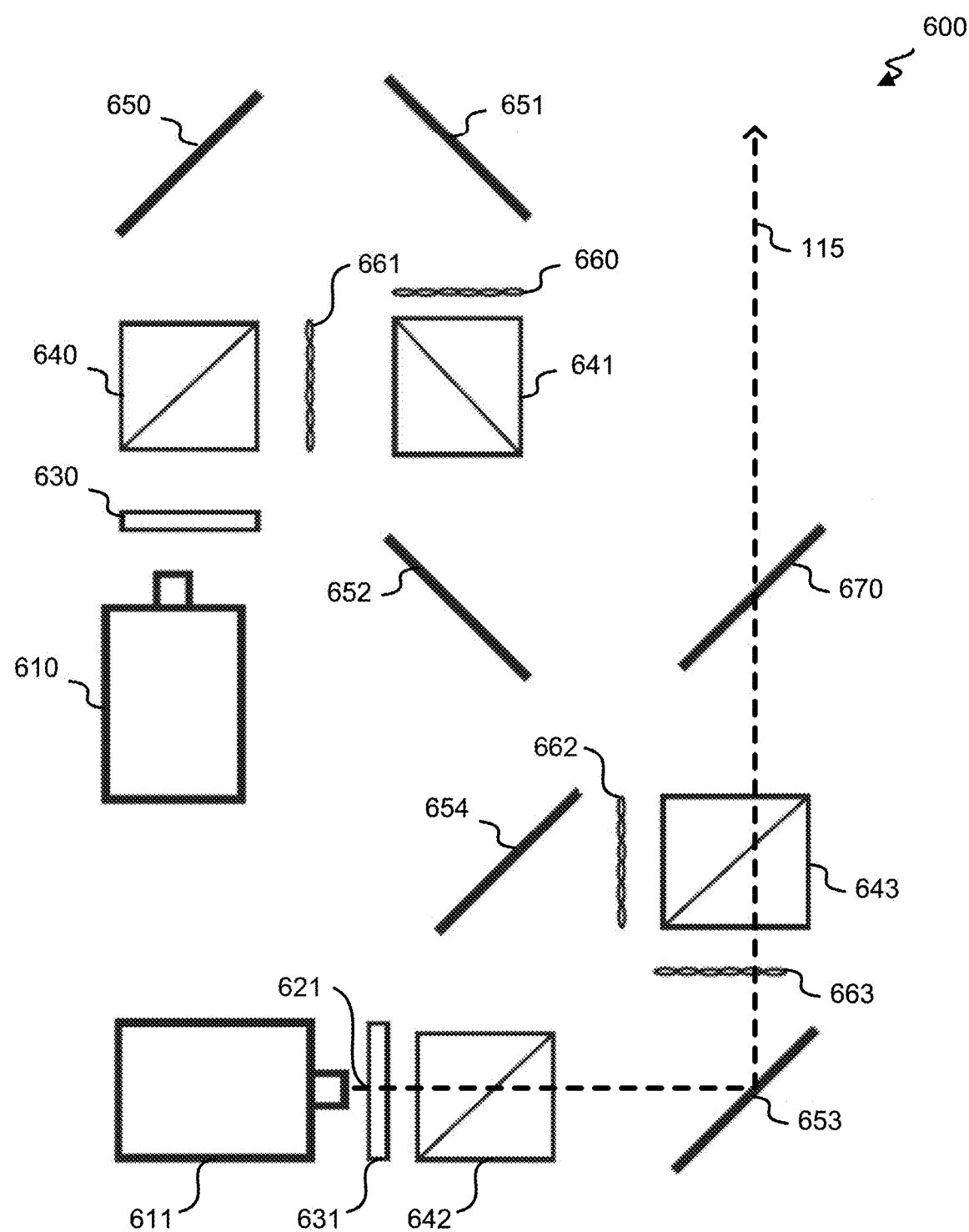

Further, as shown in FIG. 6(d), a portion of the light 621 from light source 611 passes through the half-wave plate 631 and the polarizing beamsplitter 642. The light is then reflected by reflector 653 and passes through fourth lenslet array 663. Next the light passes through the polarizing beamsplitter 643 and the dichroic 670 to form part of the excitation light 115.

FIG. 7 shows a diagram of an example of an excitation/emission separator 700. As shown in FIG. 7, the excitation light 115 from the excitation light source 110 is incident on a dichroic beamsplitter 710, which reflects the excitation light 115 toward the objective 140. A beam dump 730 may also be provided to absorb leakage light 720 of the excitation light 115 that is not reflected by the dichroic beamsplitter 710. After the excitation light 115 has caused the sample 150 to emit the fluorescence light 155, the dichroic beamsplitter 710 transmits the fluorescence light 155 toward the channel separator 170.

Figures 8A, 8B:
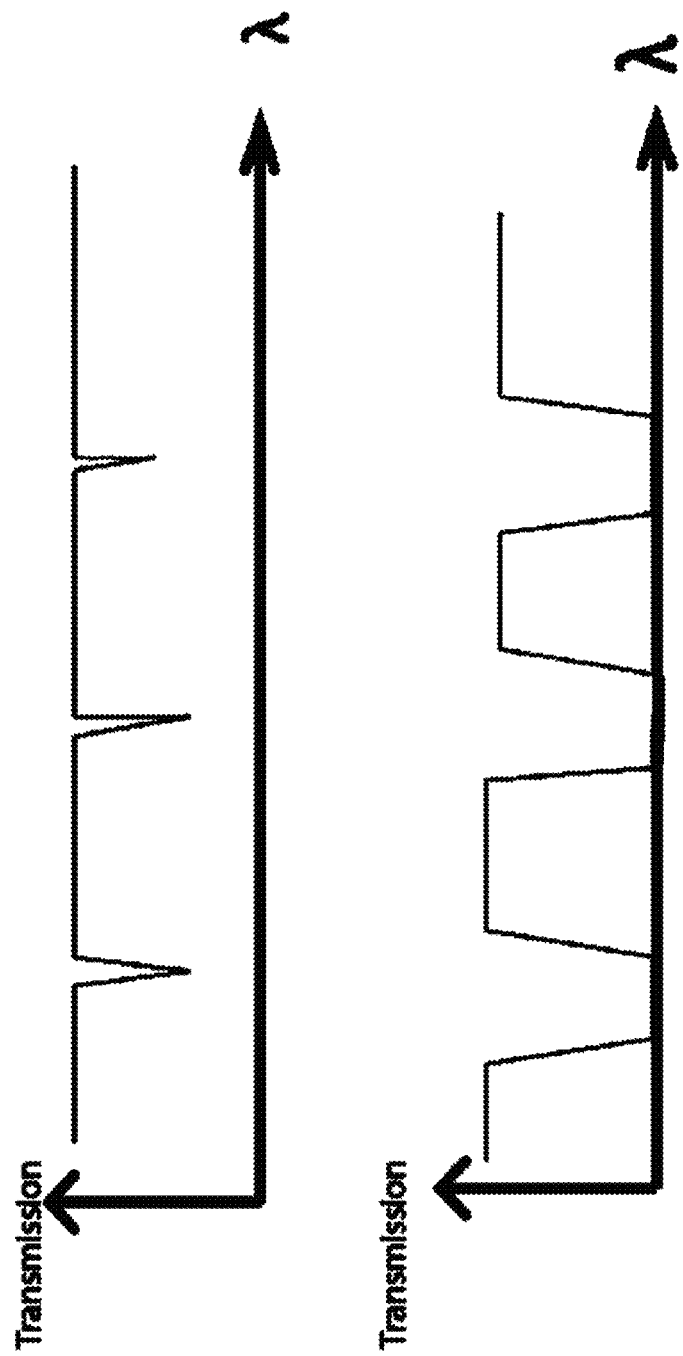
FIGS. 8(a) and 8(b) show examples of transmission spectra of the dichroic beamsplitter within the excitation/emission separator.

FIGS. 8(a) and 8(b) show examples of transmission spectra of the dichroic beamsplitter 710. These graphs show the transmission of the dichroic beamsplitter 710 as a function of wavelength. The notches in the spectra coincide with the center wavelengths of the excitation light 115. This example assumes that the excitation light source 110 includes three light sources that emit different wavelengths. The transmission spectra shown in FIG. 8(a) having narrow notches may be preferable in order to capture as much of the spectrum of the fluorescence light 155 as possible. For example, the notches may have a line width of less than 0.5 nm. It is unnecessary for the transmission of the notches to go to zero.

Figure 9A:
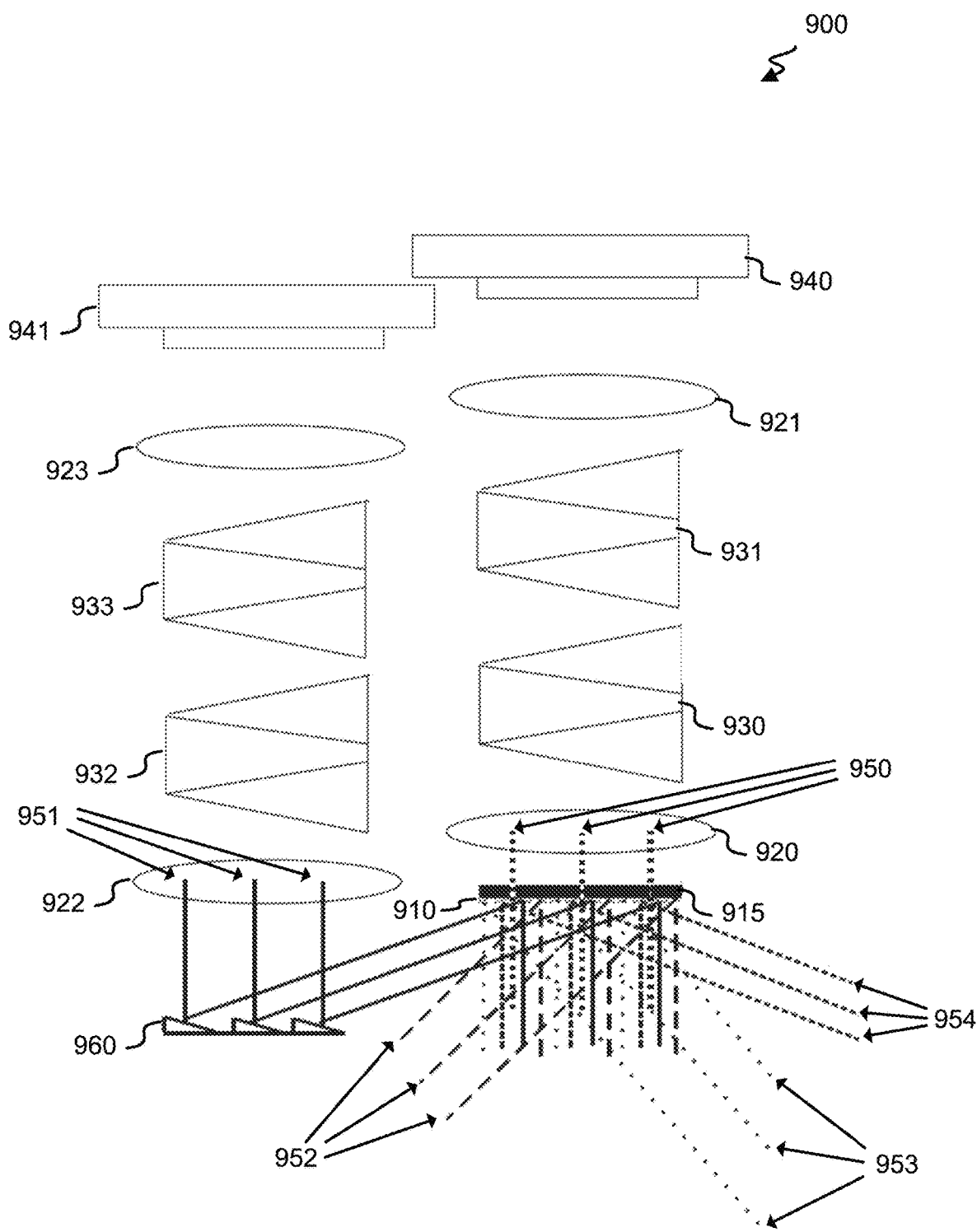
FIG. 9(a) shows a diagram of an example of a channel separator that separates the fluorescence light into a plurality of spatially dispersed spectral channels.

FIG. 9(a) shows a diagram of an example of a channel separator that separates the fluorescence light 155 into a plurality of spatially dispersed spectral channels. Each of the channels includes a portion of the fluorescence light 155 that was generated by one of the illumination patterns shown in FIG. 2. Specifically, each of the channels includes the portion of the fluorescence light 155 that was generated by a single excitation wavelength at a single depth of the sample 150. FIG. 9(a) shows an example in which five channels are used; however, the channel separator may be modified for any suitable number of channels.

As shown in FIG. 9(a), the channel separator 900 may include an optic that has a first reflective layer 910 and a patterned layer 915. The first reflective layer 910 includes a plurality of reflective elements, and the patterned layer 915 includes regions that transmit or absorb the fluorescence light 955. The fluorescence light 155 is imaged by the objective 140 and the tube lens 160 as a series of lines that matches the illumination pattern of the excitation light. The configuration of the first reflective layer 910 and the patterned layer 915 is based on the spacing between the lines and the magnification provided by the objective 140 and the tube lens 160. For example, the first reflective layer 910 and the patterned layer 915 are configured such that a first channel 950 of the fluorescence light 155 is transmitted through the optic. A portion of the patterned layer 915 that is not covered by the reflectors of the first reflective layer 910 may transmit light from the first channel 950. The light from the first channel 950 may then be collimated by a lens 920, dispersed by dispersion optics 930 and 931, and imaged by a lens 921 onto a sensor 940. For example, the dispersion optics 930 and 931 may be a set of double Amici prisms. The dispersion optics 930 and 931 may be adjusted to provide more or less dispersion, such that lines of the first channel 950 are dispersed across the entire sensor 940. For example, if the first channel 950 was generated by a light source emitting a long wavelength, the dispersion of the dispersion optics 930 and 931 may be increased to cover the sensor 940 uniformly. Most fluorophores emit light at wavelengths between approximately 400 nm and approximately 900 nm. If the excitation wavelength is 488 nm, fluorescence may be generated from 500 nm to 900 nm from the different fluorophores. On the other hand, if the excitation wavelength is 780 nm, fluorescence may be generated from 820 nm to 900 nm. Because this is a much smaller wavelength range, the dispersion may be increased to spread the spectrum over the same number of pixels as the wider wavelength range.

The reflectors of the first reflective layer 910 may be configured to reflect channels from different portions of the fluorescence light 155 in different directions. For example, light from a second channel 951 of the fluorescence light 155 may be incident on a subset of the reflectors, and reflected toward a second reflective layer 960. Reflectors within the second reflective layer 160 may flatten the wavefront, due to the pitch and angle of the reflectors, and reflect the light from the second channel 951 toward a lens 922. The light from the second channel 951 may then be collimated by the lens 922, dispersed by dispersion optics 932 and 933, and imaged by a lens 923 onto a sensor 941. For example, the dispersion optics 932 and 933 may be a set of double Amici prisms. As discussed above, the dispersion optics 932 and 933 may be adjusted to provide more or less dispersion, such that lines of the second channel 951 are dispersed across the entire sensor 941. For example, if the second channel 951 was generated by a light source emitting a long wavelength, the dispersion of the dispersion optics 932 and 933 may be increased to cover the sensor 941 uniformly.

Although only one column of optics including the second reflective layer 960 is shown in FIG. 9(a), it should be understood that there is an additional column of optics for each of the remaining channels of the fluorescence light 155. In particular, there is an additional column of optics including another set of the second reflective layer 960, the lens 951, the dispersion optics 932 and 933, the lens 923, and the sensor 941 for each of the third channel 952, the fourth channel 953, and the fifth channel 954. Depending on the numerical aperture of the fluorescence light 155, a staggered array of lenslet pairs may be provided between the first reflective layer 910 and the second reflective layer 960 in order to relay the lines or the spots from the first reflective layer 910 to the second reflective layer 960. Further, a relay and an array of apertures may be provided between the second reflective layer 960 and the lens 922 to provide confocality. Additional filters, such as long-pass filters and/or notch filters, may be provided before the first reflective layer 910, such as between the objective 140 and the tube lens 160, to condition the collimated fluorescence light 955.

Figure 9B:
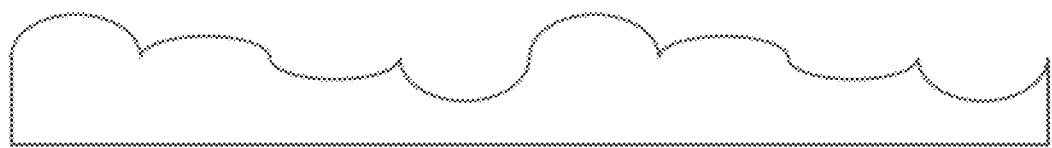
FIGS. 9(b) and 9(c) show examples of corrector plates.
Figure 9C:
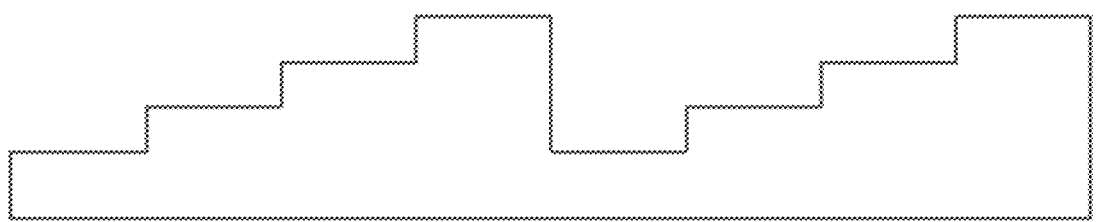

For illumination schemes 241 and 243, among others, where different stripes focus at different depths within the sample 150, the fluorescence light 155 focused by the tube lens 160 will focus at different depths at the image plane. Thus a single reflective layer 910 cannot be in-focus for all stripes at the same time, as needed for confocal pinholing. As discussed above, it is possible to include additional optics and pinholes within the channel separator 900 shown in FIG. 9(a). Another possible solution would be to add several plates at different planes within the channel separator 900. Each plate would have a sparse set of reflective facets that match up with different illumination stripes. As yet another alternative, a corrector plate could be inserted within the channel separator 900 before the image plane. FIGS. 9(b) and 9(c) show examples of corrector plates. FIG. 9(b) is a lenslet array in which the curvature is exaggerated for clarity. FIG. 9(c) is a spacer array that is thicker than the lenslet array shown in FIG. 9(b).

Figure 9D:
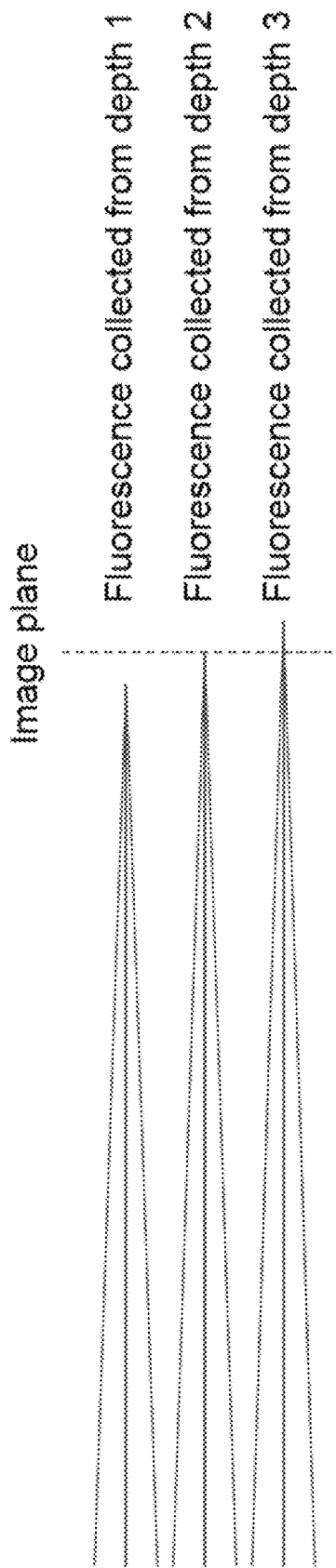
FIG. 9(d) shows an example of the focal planes if the focus of the fluorescence light collected from different depths is not corrected.
Figure 9E:
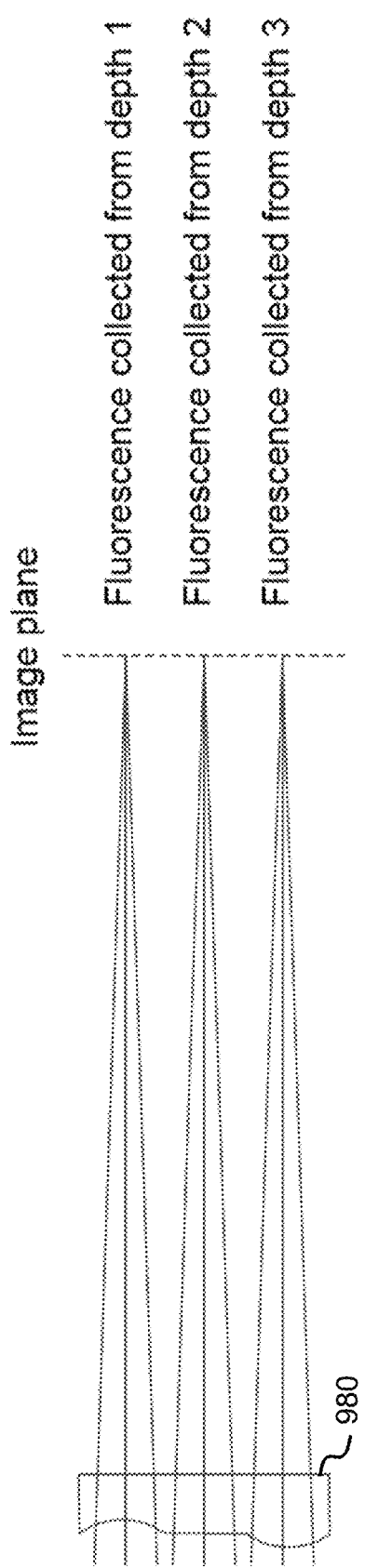
FIG. 9(e) shows an example of the focal planes if the focus of the fluorescence light collected from different depths is corrected with a corrector plate.

To avoid having signals pass through the wrong corrector plate facet, the distance z from the corrector plate to the image plane must be less than $M*dx*f\#$, where M is the magnification due to the objective 140 and the tube lens 160, dx is the excitation stripe spacing at the sample 150, and $f\#$ is the focal ratio at the image plane. Using $f\#=M/(2*NA)$, where NA is the numerical aperture of the objective 140, the distance z can be expressed as $z<M^2dx/(2*NA)$. At the same time, it is undesirable for the downstream optics if the corrector plate changes the focal ratio significantly at the image plane. Thus the distance z may be chosen to meet $z>>M^2dz$, where dz is the focal shift between different excitation stripes at the sample 150. Thus, for this scheme to be possible, the excitation stripe spacing dx may be chosen to meet $dx>>dz*(2*NA)$. For example, dz may be 3 μm and dx may be 30 μm at a NA of 0.5. The curvature of the corrector plate facets of the corrector plate shown in FIG. 9(b) or the thickness of the corrector plate shown in FIG. 9(c) may be designed to achieve a particular focal shift dz. This corrector plate could also be inserted into the excitation path, along with a uniform lenslet array, to generate multiple focal depths. FIG. 9(d) shows an example of the focal planes if the focus of the fluorescence light 155 collected from different depths is not corrected, while FIG. 9(e) shows an example of the focal planes if the focus of the fluorescence light 155 collected from different depths is corrected with a corrector plate 980.

Figure 10:
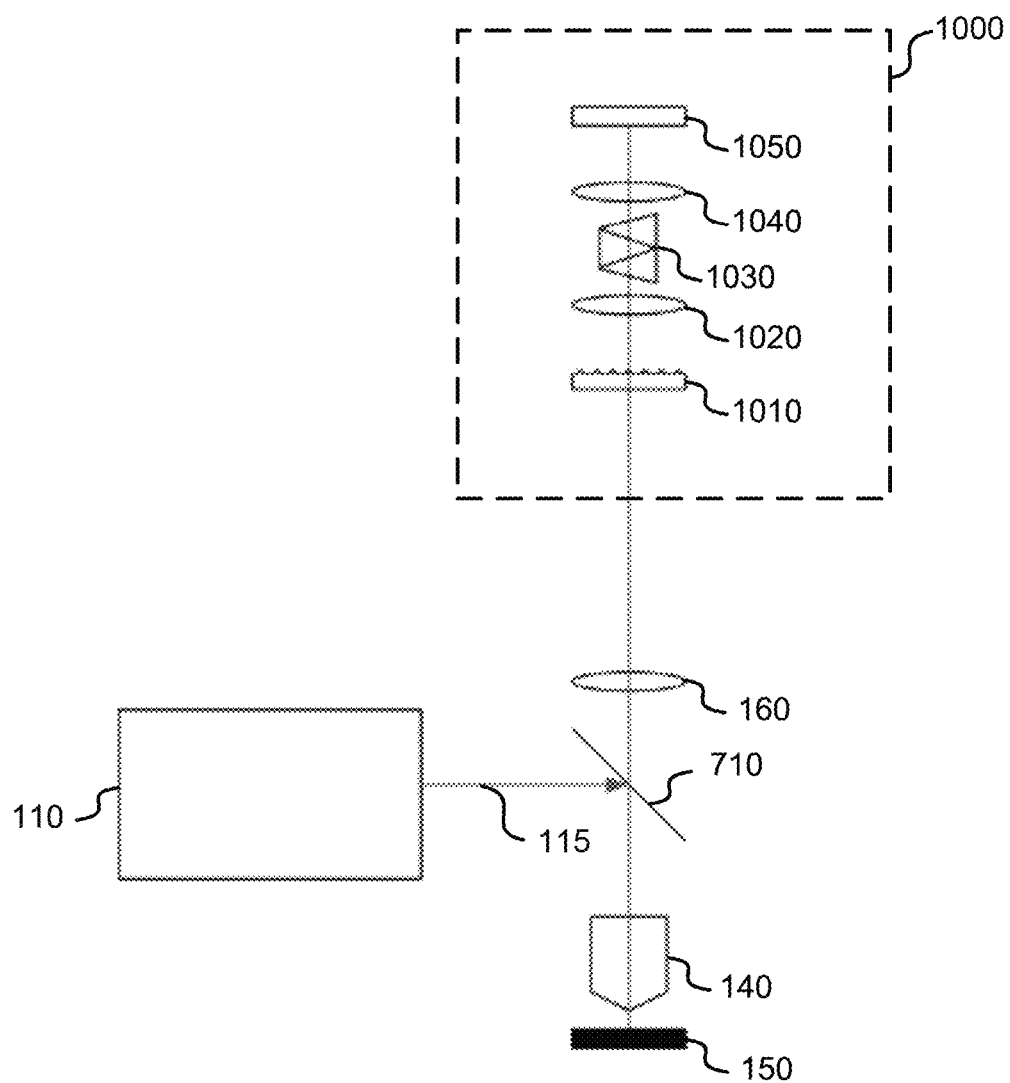
FIG. 10 shows a diagram of another example of a channel separator that separates the fluorescence light into a plurality of spatially dispersed spectral channels.
Figure 11D:
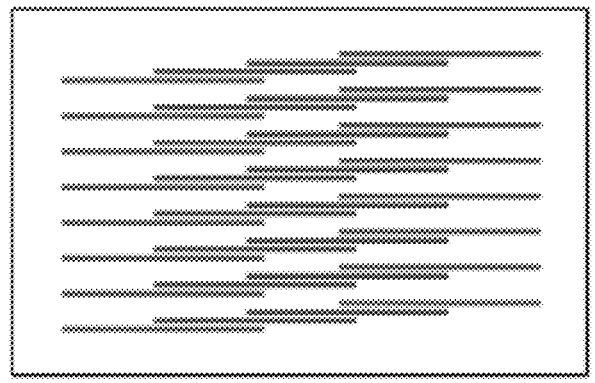
FIG. 11(d) shows an example of the spectral stripes that are formed on the sensor within the channel separator shown in FIG. 10.
Figure 11B:
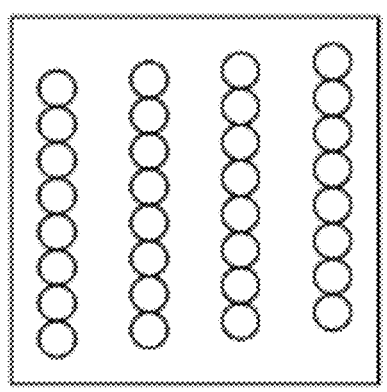
FIG. 11(b) shows an example of a layout of the lenslet array within the channel separator shown in FIG. 10.
Figure 11C:
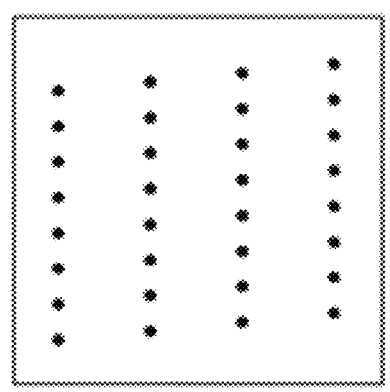
FIG. 11(c) shows an example of an intensity pattern that is generated by the lenslet array shown in FIG. 11(b)
Figure 11A:
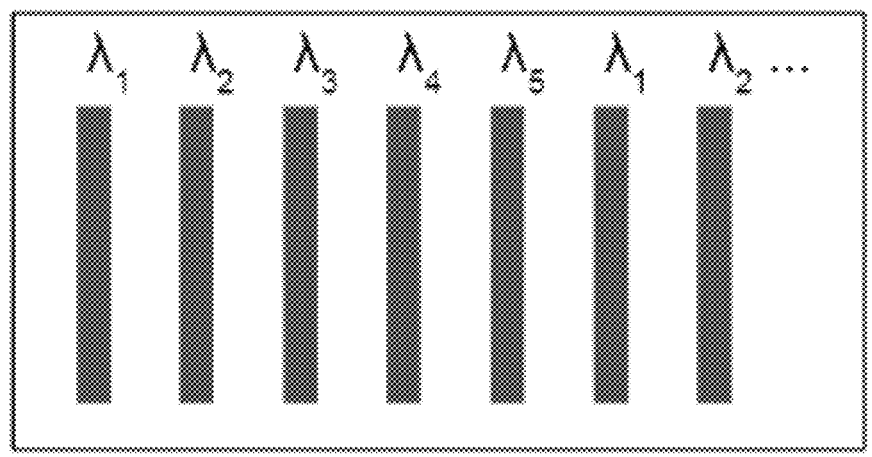
FIG. 11(a) shows an example of an illumination pattern of the excitation light that may be formed on the sample.
Figure 11H:
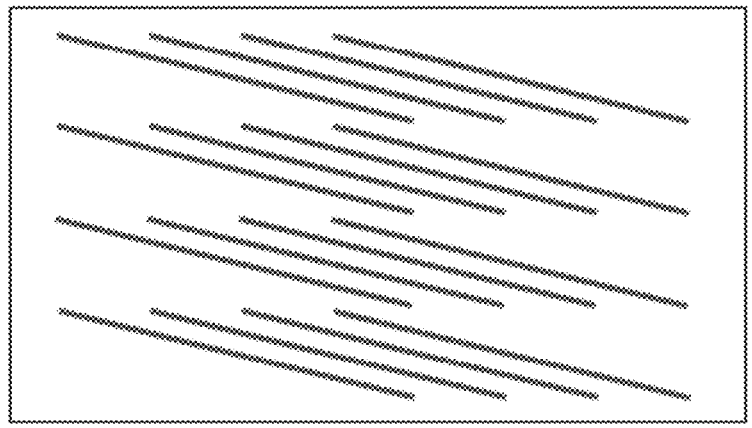
FIG. 11(h) shows an example of the spectral stripes that are formed on the sensor within the channel separator shown in FIG. 10.
Figure 11F:
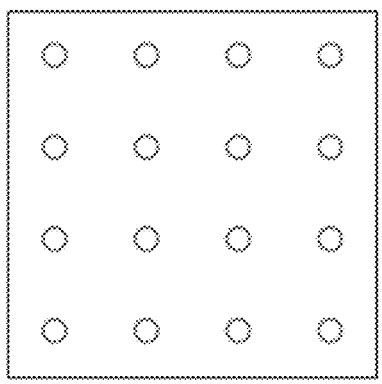
FIG. 11(f) shows another example of a layout of the lenslet array within the channel separator shown in FIG. 10.
Figure 11G:
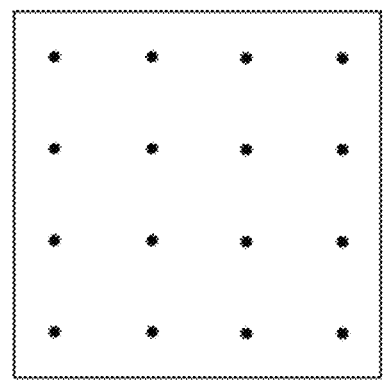
FIG. 11(g) shows an example of an intensity pattern that is generated by the lenslet array shown in FIG. 11(f)
Figure 11E:
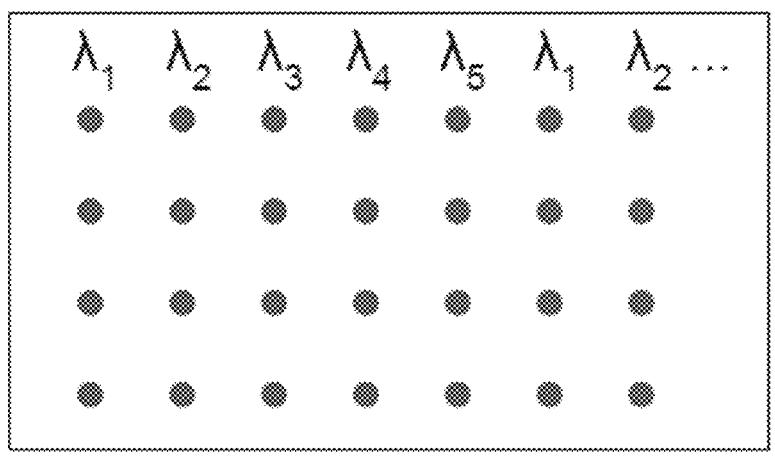
FIG. 11(e) shows an example of another illumination pattern that may be formed on the sample.
Figure 11L:
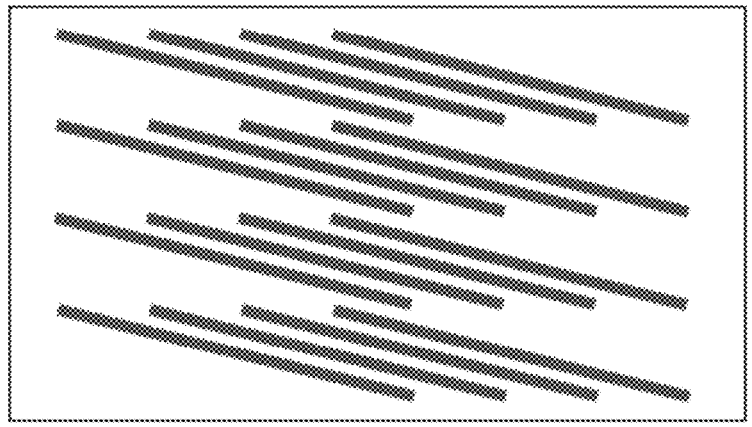
FIG. 11(i) shows an example of another illumination pattern that may be formed on the sample.
FIG. 11(j) shows an example of a pinhole array that may replace the lenslet array within the channel separator shown in FIG. 10.
FIG. 11(k) shows an example of an intensity pattern that is generated by the pinhole array shown in FIG. 11(j)
FIG. 11(1) shows an example of the spectral stripes that are formed on the sensor within the channel separator shown in FIG. 10.
Figure 11J:
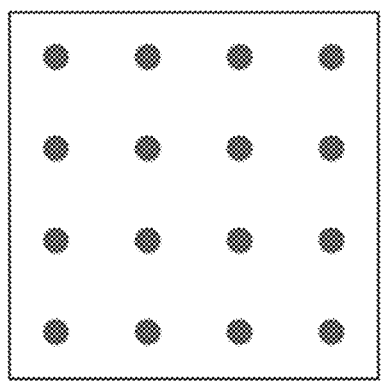
Figure 11K:
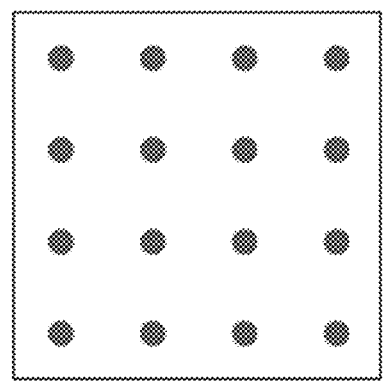
Figure 11I:
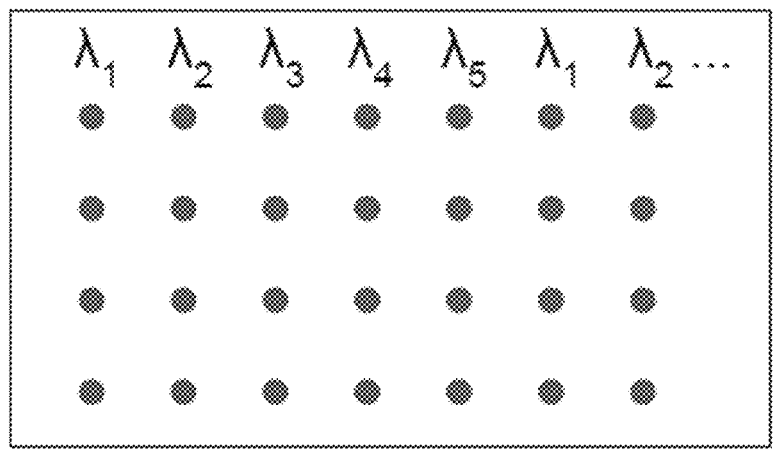

FIG. 10 shows a diagram of another example of a channel separator that separates the fluorescence light 155 into a plurality of spatially dispersed spectral channels. As shown in FIG. 10, the channel separator 1000 includes a lenslet array 1010 that concentrates each stripe of the fluorescence light 155, a lens 1020 that re-collimates the fluorescence light 155, a prism 1030 that disperses the fluorescence light 155, and a lens 1040 that images the fluorescence light 155 onto a sensor 1050 as a series of spectral stripes. The sample 150 may be scanned to collect data from the entire sample 150. The sensor 1050 may be a large-area sensor or a mosaic of smaller sensors that are optimized for rapid electronic readout.

FIG. 11(*a*) shows an example of an illumination pattern that may be formed on the sample 150. The illumination pattern shown in FIG. 11(*a*) is similar to illumination pattern 242 shown in FIG. 2, but includes stripes corresponding to excitation light having five wavelengths $\lambda_1$-$\lambda_5$. The fluorescence light 155 that is generated by this illumination pattern has a similar structure of stripes and is imaged onto the lenslet array 1010 with a large magnification.

FIG. 11(*b*) shows an example of a layout of the lenslet array 1010. The lenslet array 1010 includes a plurality of linear arrays of lenslets that are configured to receive the fluorescence light 155 that is generated by the illumination pattern shown in FIG. 11(*a*). Each of the stripes of the fluorescence light 155 is imaged onto a respective one of the linear arrays of lenslets within the lenslet array 1010. The regions between the lenslets may be masked to provide confocality and improve contrast. The linear arrays may be offset vertically relative to one another by a fraction of the lenslet pitch in order to minimize overlap between spectra on the sensor. The lenslets may have circular, square, or any other shape of aperture.

FIG. 11(*c*) shows an example of an intensity pattern that is generated by the lenslet array 1010 shown in FIG. 11(*b*). This intensity pattern is formed at the focal plane of the lenslet array 1010 when the stripes of the fluorescence light 155 are imaged onto the linear arrays of the lenslet array 1010.

FIG. 11(*d*) shows an example of the spectral stripes that are formed on the sensor 1050. The spectral stripes are formed by the lens 1020 that re-collimates the fluorescence light 155, the prism that disperses the fluorescence light 155, and the lens 1040 that images the fluorescence light 155 onto the sensor 1050. The vertical stagger within each set of horizontal stripes shown in FIG. 11(*d*) corresponds to the vertical stagger between the linear arrays of lenslets within the lenslet array 1010 shown in FIG. 11(*c*).

FIG. 11(*e*) shows an example of another illumination pattern that may be formed on the sample 150. The illumination pattern shown in FIG. 11(*e*) is similar to illumination pattern 247 shown in FIG. 2(*c*). The fluorescence light 155 that is generated by this illumination pattern has a similar structure of circular spots and is imaged onto the lenslet array 1010 with a large magnification.

FIG. 11(*f*) shows another example of a layout of the lenslet array 1010. The lenslet array 1010 includes an array of lenslets that are configured to receive the fluorescence light 155 that is generated by the illumination pattern shown in FIG. 11(*e*). Each of the circular spots of the fluorescence light 155 is imaged onto a respective one of the circular lenslets within the lenslet array 1010. The regions between the lenslets may be masked to provide confocality and improve contrast.

FIG. 11(*g*) shows an example of an intensity pattern that is generated by the lenslet array 1010 shown in FIG. 11(*f*). This intensity pattern is formed at the focal plane of the lenslet array 1010 when the circles of the fluorescence light 155 are imaged onto the linear arrays of the lenslet array 1010.

FIG. 11(*h*) shows an example of the spectral stripes that are formed on the sensor 1050. The spectral stripes are formed by the lens 1020 that re-collimates the fluorescence light 155, the prism that disperses the fluorescence light 155, and the lens 1040 that images the fluorescence light 155 onto the sensor 1050.

FIG. 11(*i*) shows an example of another illumination pattern that may be formed on the sample 150. The illumination pattern shown in FIG. 11(*e*) is similar to illumination pattern 247 shown in FIG. 2(*c*). The fluorescence light 155 that is generated by this illumination pattern has a similar structure of circular spots and is imaged onto a pinhole array that replaces the lenslet array 1010 with a large magnification.

FIG. 11(*j*) shows an example of the pinhole array that replaces the lenslet array 1010. The pinhole array includes an array of pinholes that are configured to receive the fluorescence light 155 that is generated by the illumination pattern shown in FIG. 11(*i*). Each of the circular spots of the fluorescence light 155 is imaged onto a respective one of the pinholes within the pinhole array.

FIG. 11(*k*) shows an example of an intensity pattern that is generated by the pinhole array shown in FIG. 11(*j*). This intensity pattern is formed at the focal plane of the pinhole array when the circular spots of the fluorescence light 155 are imaged onto the pinhole array.

FIG. 11(*l*) shows an example of the spectral stripes that are formed on the sensor 1050. The spectral stripes are formed by the lens 1020 that re-collimates the fluorescence light 155, the prism that disperses the fluorescence light 155, and the lens 1040 that images the fluorescence light 155 onto the sensor 1050.

Figure 12:
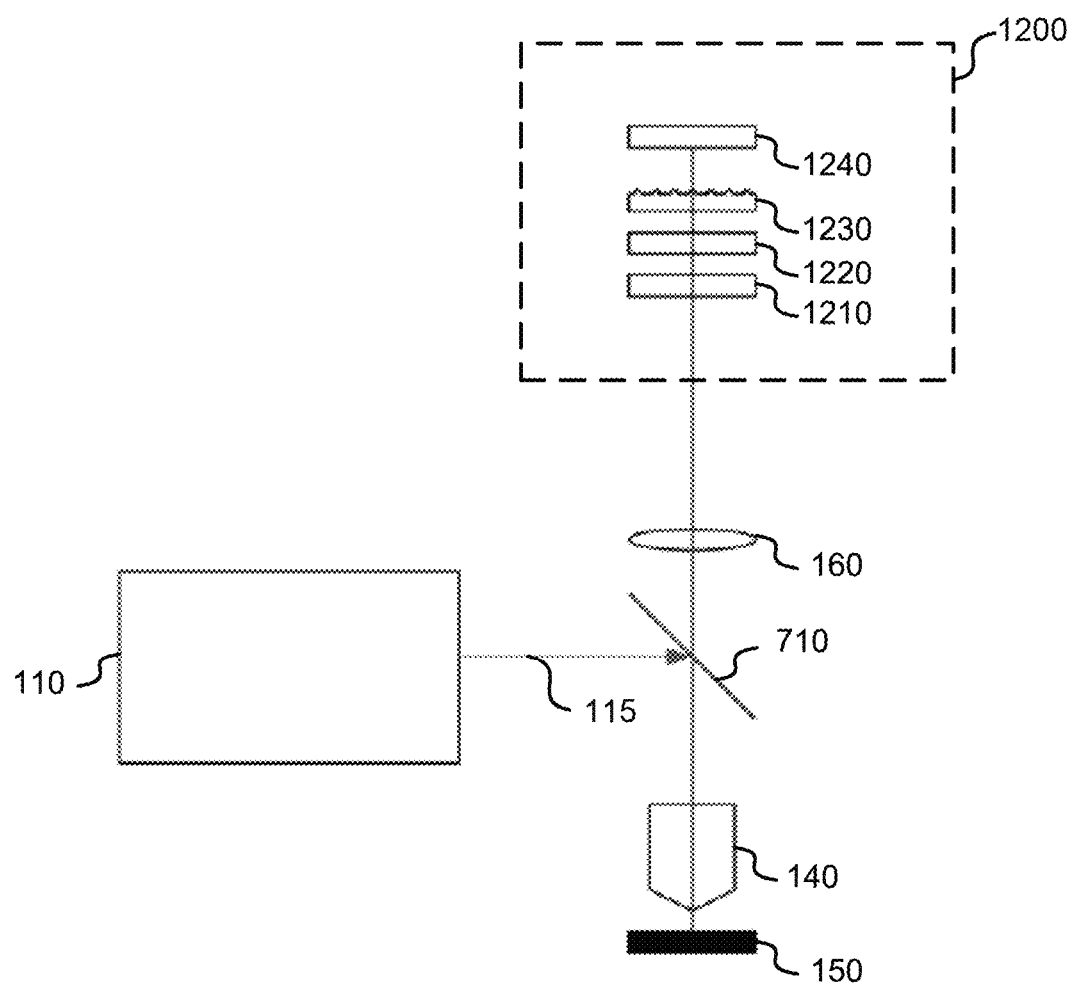
FIG. 12 shows a diagram of another example of a channel separator that separates the fluorescence light into a plurality of spatially dispersed spectral channels.

FIG. 12 shows a diagram of another example of a channel separator that separates the fluorescence light 155 into a plurality of spatially dispersed spectral channels. As shown in FIG. 12, the channel separator 1200 includes a prism array 1210 and a diffraction grating 1220 that disperse the fluorescence light 155, and a lenslet array 1230 that concentrates each stripe of the fluorescence light 155 onto a sensor 1240 as a series of spectral stripes. The lenslet array 1230 may have the same structure as the lenslet array shown in FIG. 11(*b*). The prism array 1210 may have facet angles chosen to cancel the first-order diffraction angle of the grating for a specified design wavelength. This allows the dispersed light to enter the lenslet array 1230 nearer to normal incidence, thereby reducing astigmatism, and in some cases improving the performance of the sensor 1240 as well. The pitch (period) of the prism array 1210 may be chosen to match the pitch of the lenslet array 1230 for improved focusing. The pitch of the lenslet array 1230 may also be chosen to be an integer multiple of the pitch of the diffraction grating 1220 for improved uniformity of the spectra generated at the sensor 1240. The sample 150 may be scanned to collect data from the entire sample. The sensor 1050 may be a large-area sensor or a mosaic of smaller sensors that are optimized for rapid electronic readout.

In addition to the dimensions discussed above, the system 100 may be used to acquire data in a sixth dimension of time. The system 100 may acquire hyperspectral data at different sample locations as discussed above, and then monitor those locations as a function of time. For example, this could be used to unmix fluorophores that have different bleaching rates. It could also be used in conjunction with fast sensors to determine the fluorescence lifetime.

Exemplary embodiments of the invention may provide several advantages. For example, it may be possible to maximize collection of the fluorescence photons, which would minimize bleaching and maximize the signal-to-noise ratio to improve spectral unmixing. In addition, the dispersion of each fluorescence channel may be adjusted to maximize the use of the pixels in the sensor. Further, multiple excitation channels may be simultaneously acquired, such that multiple depths may be scanned and/or multiple excitation wavelengths may be used.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system comprising:
   an excitation light source that is configured to emit excitation light and direct the excitation light through a sample such that the excitation light causes the sample to emit fluorescence light, wherein the excitation light source comprises:
   a light source, and
   a lens configured to receive light from the light source and generate an excitation stripe;
   an objective that is configured to receive the fluorescence light from the sample and generate imaged fluorescence light;
   a slit, positioned to receive the imaged fluorescence light and configured to transmit the imaged fluorescence light;
   a channel separator configured to receive fluorescence light transmitted through the slit and separate the fluorescence light into a plurality of spatially dispersed spectral channels, wherein the channel separator comprises:
   a first collimating lens,
   a second collimating lens, and
   one or more dispersion optics between the first and second collimating lenses; and
   a sensor that is configured to receive the plurality of spatially dispersed spectral channels from the channel separator.

2. The system according to claim 1, wherein the slit comprises a patterned layer comprising a transmitting region and one or more reflecting or absorbing regions, wherein the transmitting region is configured to transmit the imaged fluorescence light.

3. The system according to claim 1, wherein the lens configured to receive light from the light source and generate the excitation stripe comprises a cylindrical lens.

4. The system according to claim 1, further comprising a filter configured to block light from the excitation light source from reaching the sensor.

5. The system according to claim 4, wherein the filter comprises one or more of a single-notch filter, a long-pass filter, or a multi-notch filter.

6. The system according to claim 1, further comprising one or more tube lenses configured for imaging the fluorescence light together with the objective.

7. The system according to claim 1, wherein the one or more dispersion optics comprise a plurality of prisms.

8. The system according to claim 1, wherein the one or more dispersion optics comprise a set of double Amici prisms.

9. The system according to claim 1, wherein the one or more dispersion optics are adjustable to provide more or less dispersion.

10. The system according to claim 1, wherein the excitation light source further comprises one or more additional light sources, wherein the lens is configured to receive light from the one or more additional light sources and generate one or more additional excitation stripes, each of the one or more additional excitation stripes causing the sample to emit additional fluorescence light, and wherein the objective is configured to image the additional fluorescence light.

11. A method comprising:
   emitting excitation light by an excitation light source, wherein the excitation light source comprises:
      a light source, and
      a lens configured to receive light from the light source and generate an excitation stripe;
   directing the excitation stripe onto a sample such that the excitation stripe causes the sample to emit fluorescence light;
   generating imaged fluorescence light from the fluorescence light using an objective;
   transmitting the imaged fluorescence light through a slit;
   separating, by a channel separator, fluorescence light transmitted through the slit into a plurality of spatially dispersed spectral channels, wherein the channel separator comprises:
      a first collimating lens,
      a second collimating lens, and
      one or more dispersion optics between the first and second collimating lenses; and
   receiving, by a sensor, the plurality of spatially dispersed spectral channels from the channel separator.

12. The method according to claim 11, wherein the slit comprises a patterned layer comprising a transmitting region and one or more reflecting or absorbing regions, wherein the transmitting region is configured to transmit the imaged fluorescence light.

13. The method according to claim 11, wherein the lens configured to receive light from the light source and generate the excitation stripe comprises a cylindrical lens.

14. The method according to claim 11, further comprising blocking light from the excitation light source from reaching the sensor using a filter.

15. The method according to claim 14, wherein the filter comprises one or more of a single-notch filter, a long-pass filter, or a multi-notch filter.

16. The method according to claim 11, wherein generating imaged fluorescence light from the fluorescence light comprising using one or more tube lenses together with the objective.

17. The method according to claim 11, wherein the one or more dispersion optics comprise a plurality of prisms.

18. The method according to claim 11, wherein the one or more dispersion optics comprise a set of double Amici prisms.

19. The method according to claim 11, wherein the one or more dispersion optics are adjustable to provide more or less dispersion.

20. The method according to claim 11, wherein the excitation light source further comprises one or more additional light sources, wherein the lens is configured to receive light from the one or more additional light sources and generate one or more additional excitation stripes, each of the one or more additional excitation stripes causing the sample to emit additional fluorescence light, and wherein the objective is configured to image the additional fluorescence light.

* * * * *